United States Patent
Konaka et al.

[11] Patent Number: 5,822,656
[45] Date of Patent: Oct. 13, 1998

[54] IMAGE FORMING APPARATUS IN WHICH A PLURALITY OF IMAGE SEGMENTS ARE INTEGRATED INTO COMPLETE IMAGE

[75] Inventors: Toshio Konaka; Kazuhiko Sato, both of Kawasaki, Japan

[73] Assignee: Fujitsu Limited, Kawasaki, Japan

[21] Appl. No.: 966,843

[22] Filed: Nov. 7, 1997

Related U.S. Application Data

[63] Continuation of Ser. No. 512,708, Aug. 8, 1995, abandoned.

[30] Foreign Application Priority Data

Oct. 5, 1994 [JP] Japan .................................. 6-241687

[51] Int. Cl.⁶ .................................................. G03G 15/22
[52] U.S. Cl. .......................................... 399/130; 358/450
[58] Field of Search ..................... 399/194, 401, 399/130, 302, 308; 358/450; 395/115–117

[56] References Cited

U.S. PATENT DOCUMENTS

| | | | |
|---|---|---|---|
| 5,109,476 | 4/1992 | Thompson | 395/105 |
| 5,164,781 | 11/1992 | Terashima et al. | 399/130 |
| 5,177,507 | 1/1993 | Ng | 355/326 R X |
| 5,194,899 | 3/1993 | Buchanan | 355/271 X |
| 5,392,076 | 2/1995 | Fujiwara | 348/719 |
| 5,465,163 | 11/1995 | Yoshihara et al. | 358/444 |
| 5,517,319 | 5/1996 | Arai | 358/300 |
| 5,585,936 | 12/1996 | Eto et al. | 358/450 |

FOREIGN PATENT DOCUMENTS 05316328  11/1993  Japan .

*Primary Examiner*—Robert Beatty
*Attorney, Agent, or Firm*—Armstrong, Westerman, Hattori, McLeland & Naughton

[57] ABSTRACT

An image forming apparatus includes a photosensitive drum, an intermediate transfer drum, a divisional image forming system for forming image segments into which an image to be formed is divided on the intermediate transfer drum one by one, a sheet feeding mechanism for feeding a recording sheet, and a transfer device for transferring an image segment from the intermediate transfer drum to a recording sheet fed by the sheet feeding mechanism every time the image segment is formed on the intermediate transfer drum. A control unit for controlling the sheet feeding mechanism and the transfer device is also provided so that the image segments formed by the divisional image forming system are successively transferred from the intermediate transfer drum to the recording sheet so as to be continuous with each other.

11 Claims, 23 Drawing Sheets

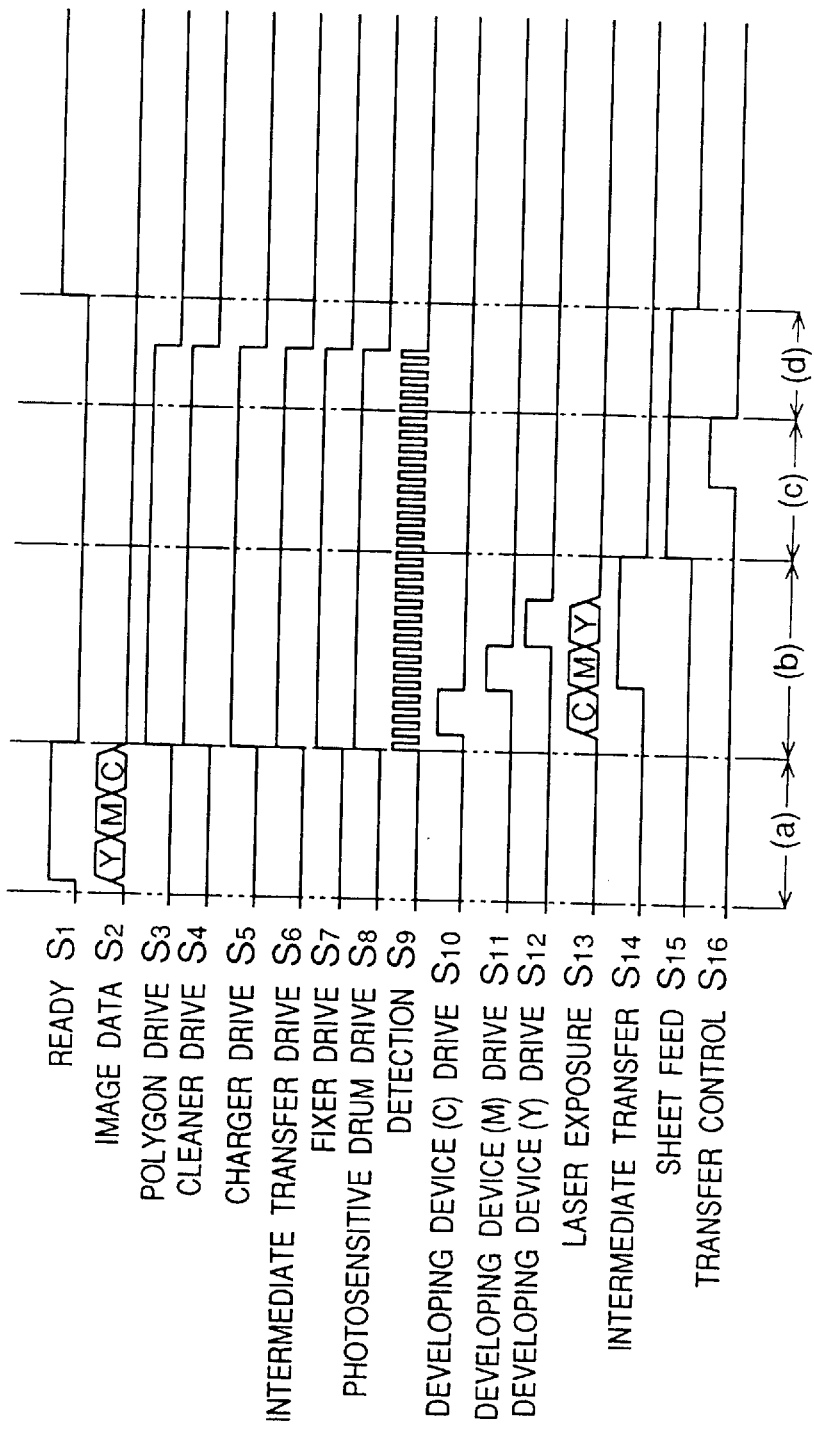

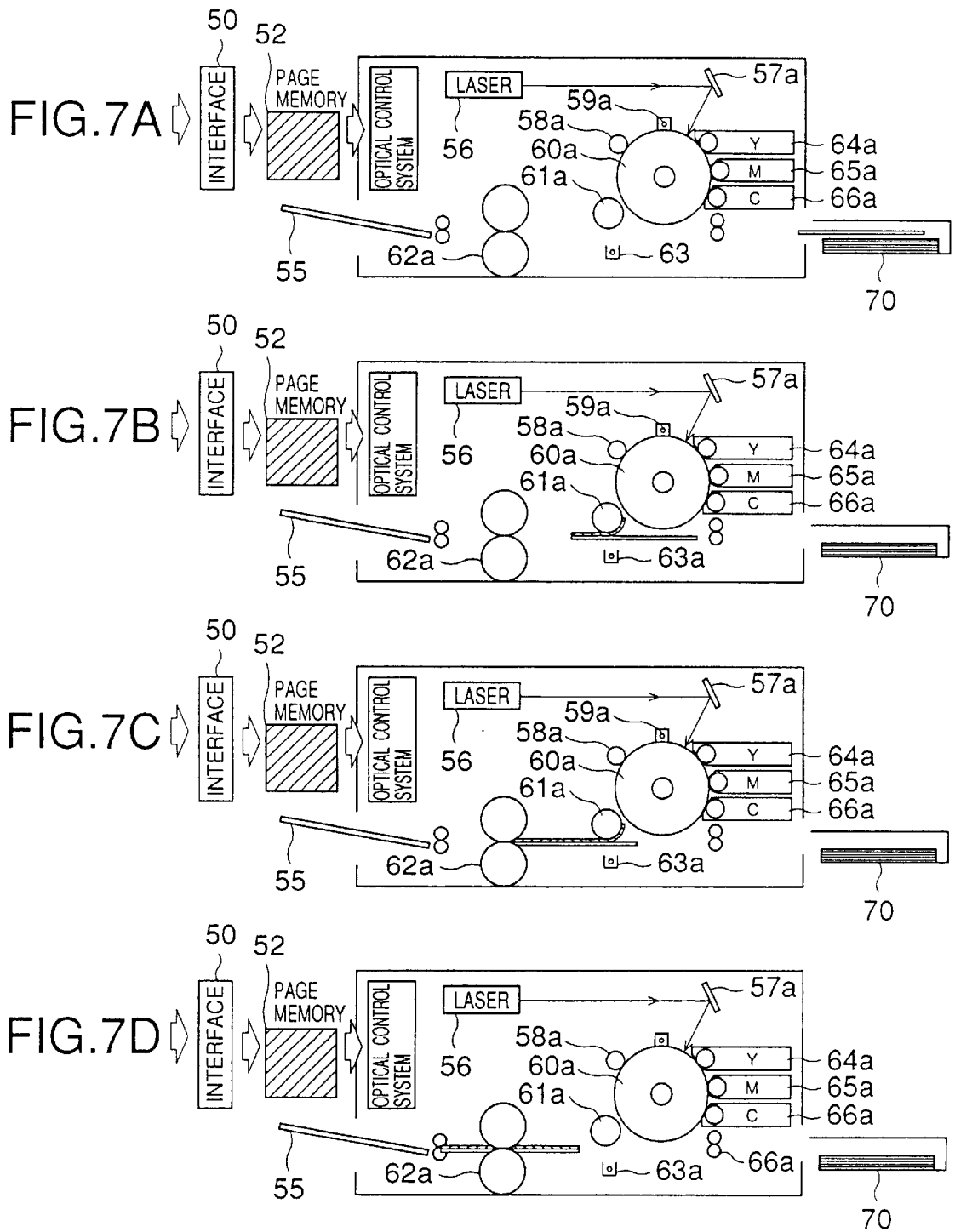

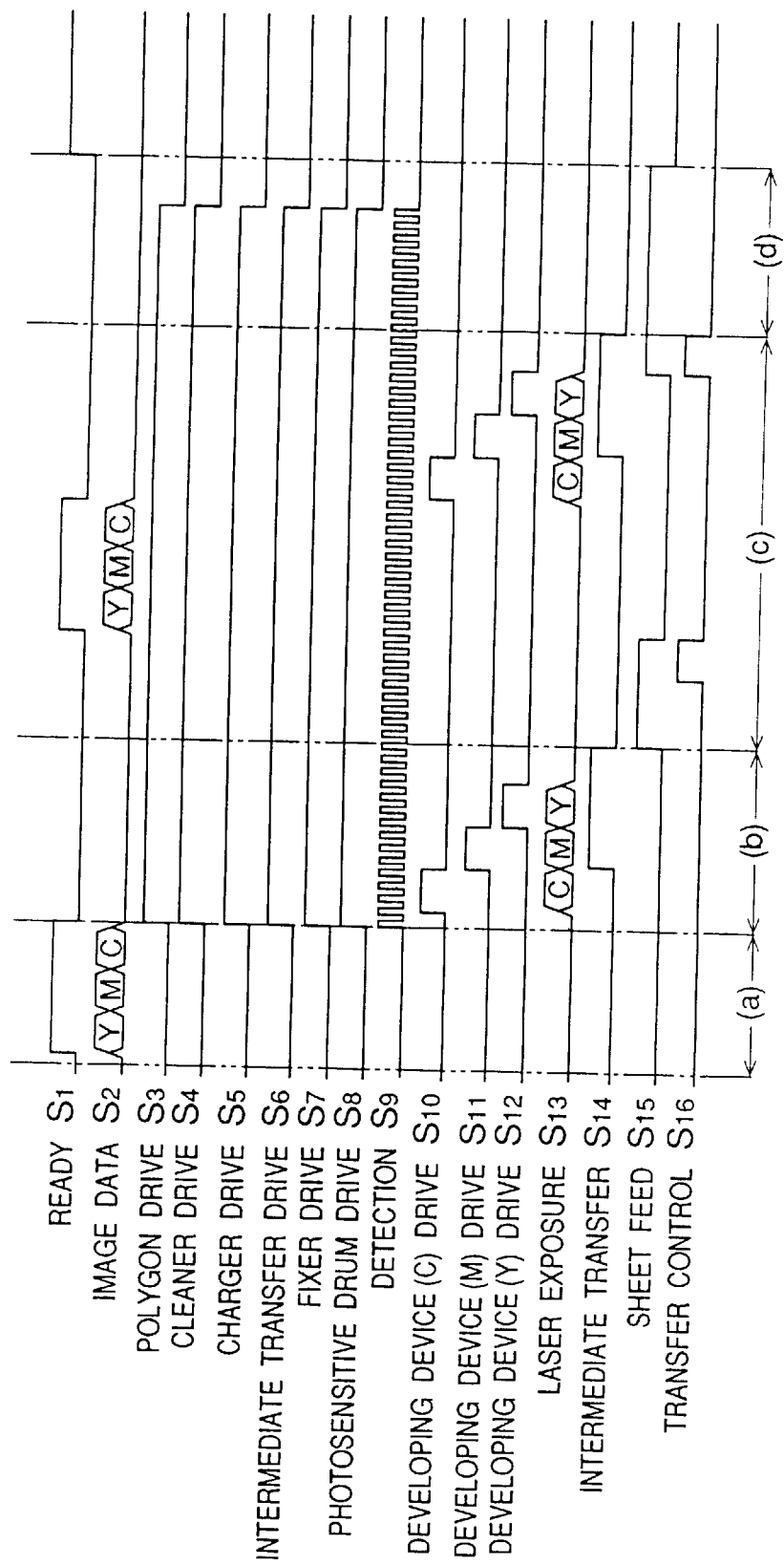

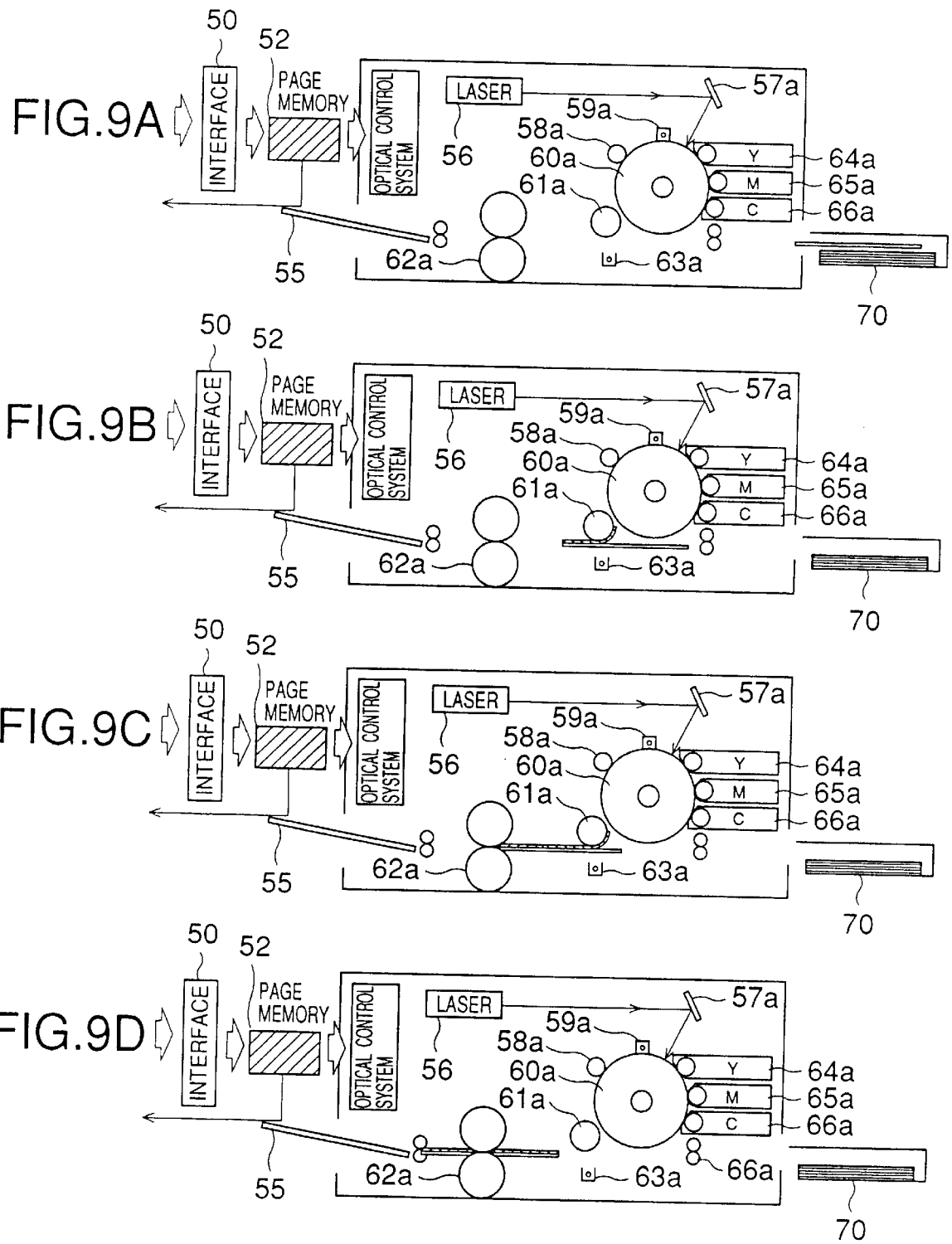

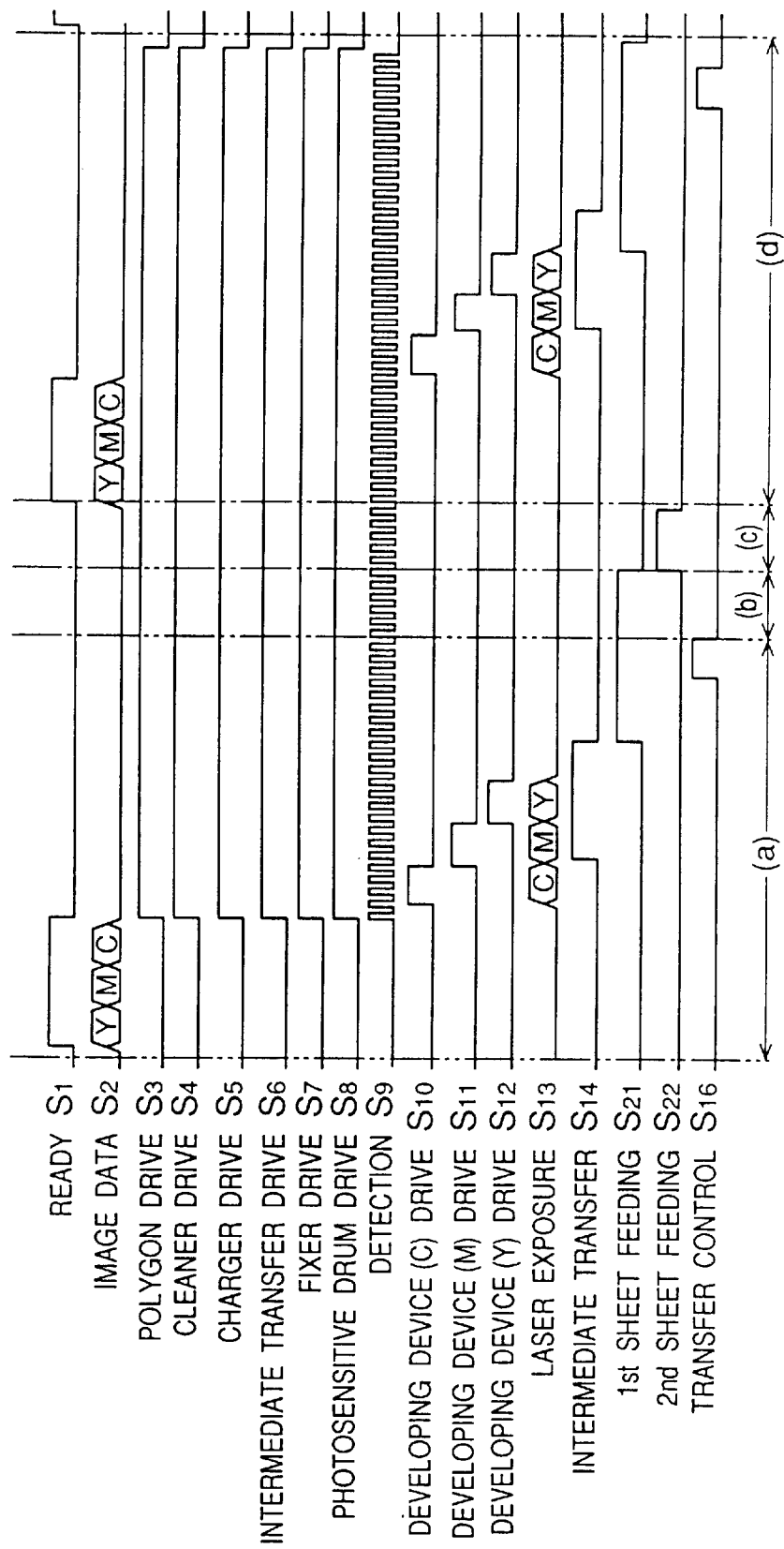

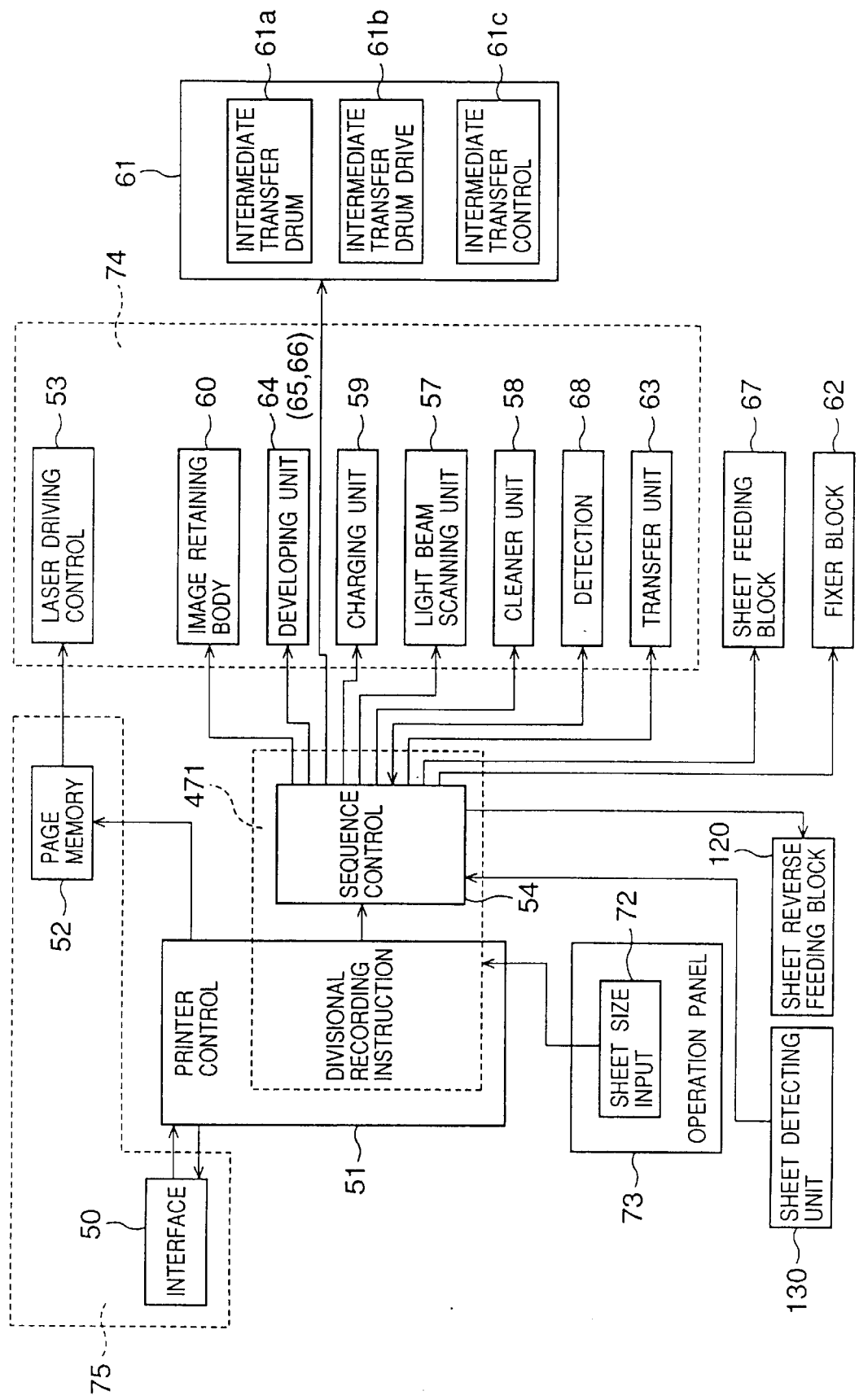

IMAGE FORMING APPARATUS IN WHICH A PLURALITY OF IMAGE SEGMENTS ARE INTEGRATED INTO COMPLETE IMAGE

This application is a Continuation of application Ser. No. 08/512,708 filed Aug. 8, 1995, now abandoned.

BACKGROUND OF THE INVENTION

(1) Field of the Invention

The present invention generally relates to an image forming apparatus, such as an electrophotographic type color image printer or copier, and more particularly to an image forming apparatus in which a plurality of images are overlapped so that an image, such as a color image, is formed.

(2) Description of the Related Art

For example, in a conventional electrophotographic type color printer, a yellow toner image, a magenta toner image and a cyan toner image are overlapped so that a image is formed. The color image is formed on a recording sheet. There are two types of mechanisms for forming a color image on a sheet. In the first type of mechanism, a yellow toner image, a magenta toner image and a cyan toner image are directly overlapped on a sheet so that a color image is formed on the sheet. In the second type of mechanism, a yellow toner image, a magenta toner image and a cyan toner image are overlapped on an intermediate retaining member, and these images are then transferred from the intermediate retaining member to a sheet so that a color image is formed on the sheet.

A conventional laser printer having the first type of mechanism is shown in FIG. 1A.

Referring to FIG. 1A, a charger 203 uniformly charges a photosensitive drum 205, and a laser beam modulated in accordance with image data then exposes the charged photosensitive drum 205 so that an electrostatic latent image corresponding to the image data is formed on the photosensitive drum 205. The electrostatic latent image is developed by using a toner selected from among yellow toner (Y), magenta toner (M) and cyan toner (C) in a developing unit 207 so that a toner image is formed on the photosensitive drum 205.

A recording sheet supplied from a sheet cassette 208 is wound on a winding drum 206 located adjacent to the photosensitive drum 205. The toner image is then transferred to the recording sheet.

The above processes (of uniformly charging, exposing, developing and transferring) are repeatedly executed three times while changing the used color toner, so that a yellow toner image, a magenta toner image and a cyan toner image are overlapped on the recording sheet. As a result, a color image is formed on the recording sheet wound on the winding drum 206.

After this, the recording sheet is separated from the winding drum 206 by a discharger 210, the color image is then fixed on the recording sheet by an fixer 202, and the recording sheet on which the color image is fixed is ejected to a tray 201. After each transferring process, residual toner is removed from the photosensitive drum 205 by a cleaner unit 204.

A conventional laser printer having the second type of mechanism is shown in FIG. 2A. Operations of the laser printer are controlled by signals as shown in FIG. 3.

Referring to FIG. 2A, the laser printer has a photosensitive drum 225, a charger 223, a developer 227 including the yellow toner, the magenta toner and the cyan toner and a cleaner unit 224. The laser printer further has an intermediate transfer drum 226. In the laser printer, processes of uniformly charging, exposing, developing and transferring are repeatedly executed three times while changing the used color toner in the same manner as in the above case.

The transfer process has two steps. In a first step, the yellow toner image, the magenta toner image and the cyan toner image are successively transferred to the intermediate transfer drum 226 based on an intermediate transfer signal S14 as shown in FIG. 3. As a result, the yellow toner image, the magenta toner image and the cyan toner image are overlapped on the intermediate transfer drum 226, so that a color image is formed on the intermediate transfer drum 226.

In a second step, a recording sheet is fed from a sheet cassette 228 based on a sheet feeding signals S15 as shown in FIG. 3, and the color image is then transferred from the intermediate transfer drum 226 to the recording sheet by a discharger 229 based on a transfer signal S16. As a result, the color image is formed on the recording sheet.

After this, the color image is fixed on the recording sheet by the fixer 222. The recording sheet on which the color image is fixed is ejected to a tray 221.

In the above laser printers having two types of mechanism for forming a color image on a sheet, in order to increase the size of a recording sheet usable in the laser printer, the diameters of the winding drum and the intermediate transfer drum must be increased as shown in FIGS. 1B and 2B (see a winding drum 211 in FIG. 1B and an intermediate transfer drum 230 in FIG. 2B). As a result, the size of the laser printers is increased.

In addition, to increase the size of a sheet usable in the laser printer, the capacity of an image memory for storing image data must be increased. As a result, the cost of the laser printer is increased.

SUMMARY OF THE INVENTION

Accordingly, a general object of the present invention is to provide a novel and useful image forming apparatus in which the disadvantages of the aforementioned prior art are eliminated.

A specific object of the present invention is to provide an image forming apparatus capable of forming a large image on a sheet using a small mechanism.

Another object of the present invention is provide an image forming apparatus capable of forming an image on a sheet using a small capacity memory.

The above objects of the present invention are achieved by an image forming apparatus comprising: an intermediate medium; divisional image forming means for forming image segments into which an image to be formed is divided on the intermediate medium one by one; sheet feeding means for feeding a recording sheet; transfer means for transferring an image segment from the intermediate medium to a recording sheet fed by the sheet feeding means every time the image segment is formed on the intermediate medium; and control means for controlling the sheet feeding means and the transfer means so that the image segments formed by the divisional image forming means are successively transferred from the intermediate medium to the recording sheet so as to be continuous with each other.

According to the present invention, the image to be formed is divided into image segments and the image segments formed on the intermediate medium are transferred to a recording sheet so that the segment images are continuous with each other. Thus, since the intermediate medium may have an area sufficient to retain each image segment, the intermediate medium can be miniaturized.

In addition, in a case where an image data segment corresponding to each image segment is stored in a memory and each image segment is formed on the intermediate medium using the image data segment stored in the memory, since the memory may have a capacity sufficient to store the image data segment, the image can be formed using a memory having a small capacity.

BRIEF DESCRIPTION OF THE DRAWINGS

Other objects, features and advantages of the present invention will be apparent from the following detailed description when read in conjunction with the accompanying drawings, in which:

FIG. 3 is a timing chart illustrating states of signals used for operations of the laser printer shown in FIGS. 2A and 2B;

FIGS. 7A, 7B, 7C and 7D are diagrams illustrating operations of the laser printer according to the first embodiment of the present invention;

FIG. 8 is a timing chart illustrating states of signals used for operations of the laser printer according to the first embodiment of the present invention;

FIGS. 9A, 9B, 9C and 9D are diagrams illustrating operations of the laser printer according to the second embodiment of the present invention;

FIG. 17 is a timing chart illustrating states of signals used for operations of the laser printer according to the fourth embodiment of the present invention;

FIG. 20 is a block diagram illustrating the laser printer according to a sixth embodiment of the present invention;

DESCRIPTION OF THE PREFERRED EMBODIMENTS

A description will be given, with reference to drawings, of embodiments of the present invention.

Figures 1A, 1B:
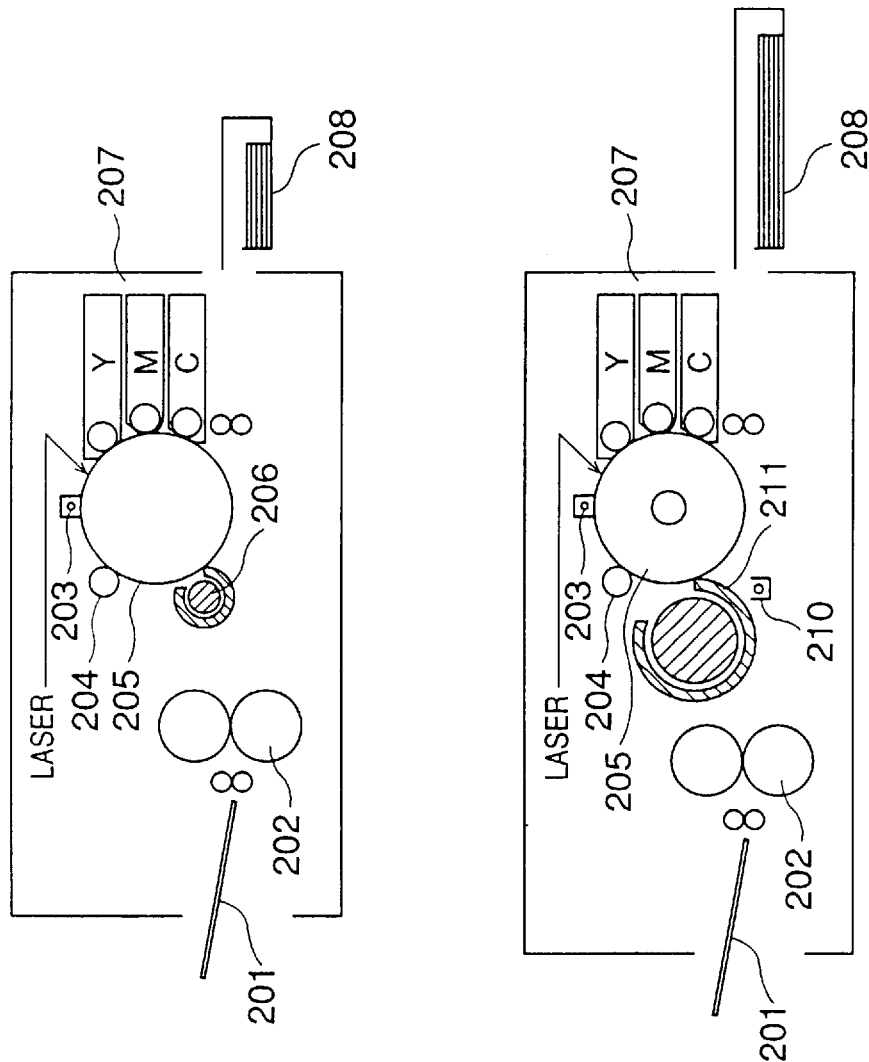
FIGS. 1A and 1B are diagrams illustrating a conventional laser printer having a first type of mechanism for overlapping a plurality of toner images so that a color image is formed.
Figures 2A, 2B:
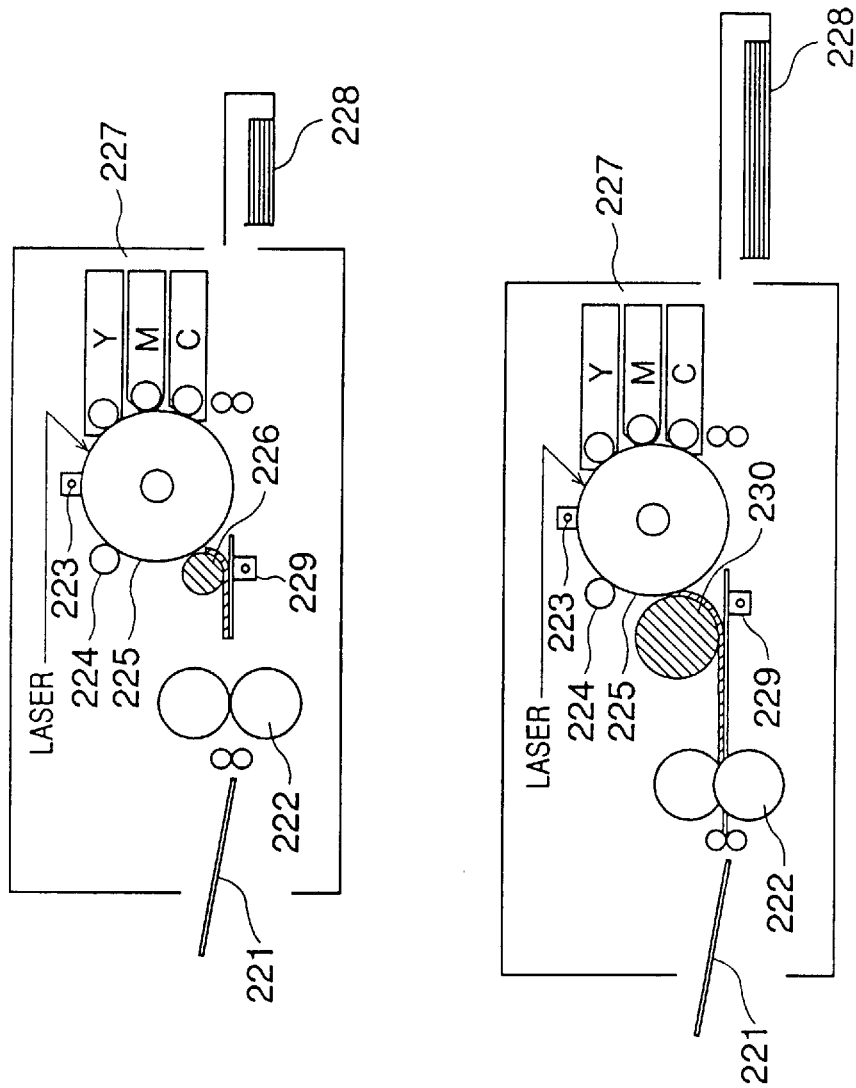
FIGS. 2A and 2B are diagrams illustrating a conventional laser printer having a second type of mechanism for overlapping a plurality of toner images so that a color image is formed.
Figure 4:
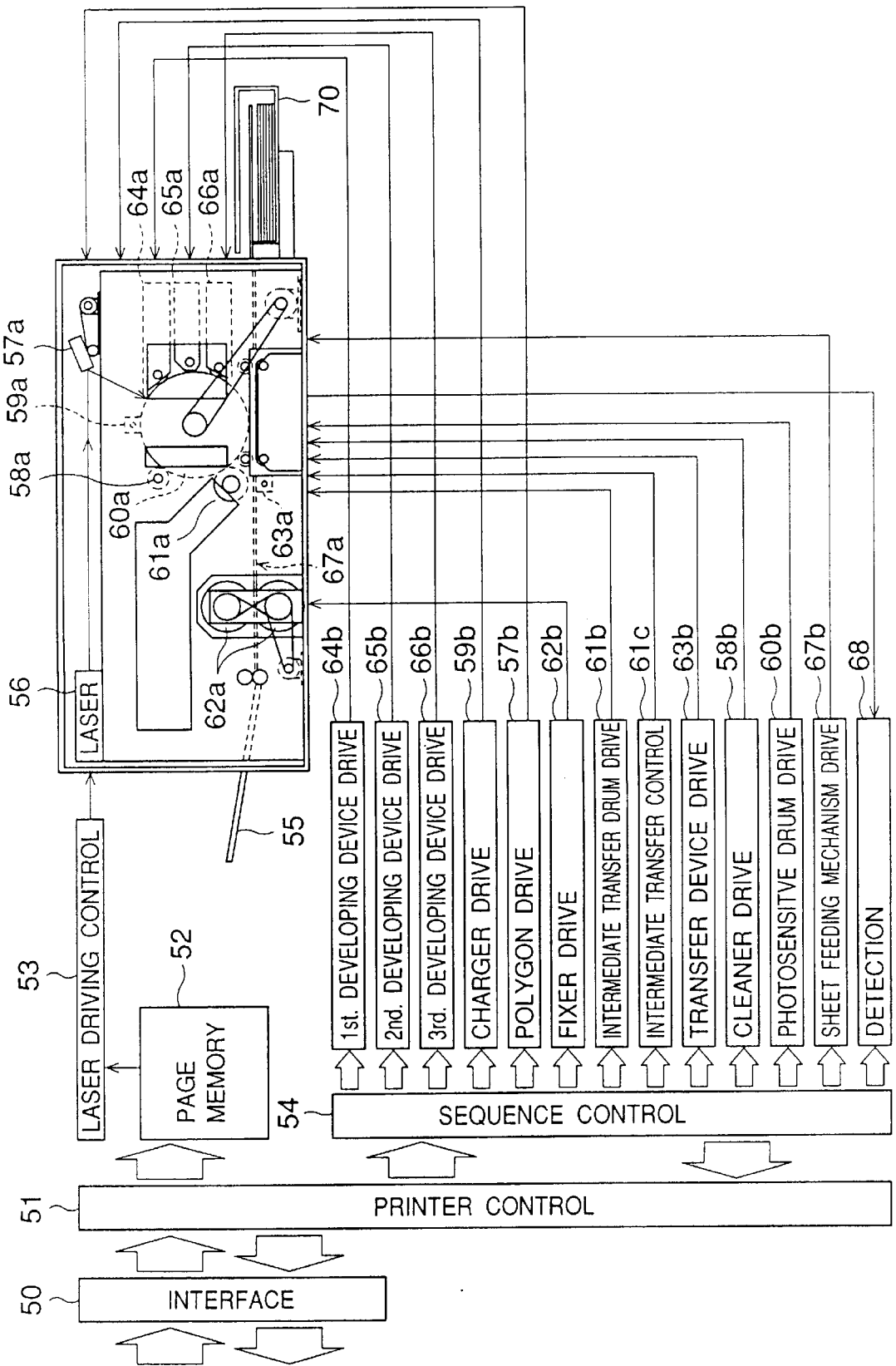
FIG. 4 is a diagram illustrating a mechanism and a control system of a laser printer according to first and second embodiments of the present invention.

A color laser printer according to a first embodiment of the present invention has a printing mechanism and a control system as shown in FIG. 4. Referring to FIG. 4, the printing mechanism is provided with a laser unit 56, a polygonal mirror 57a, a photosensitive drum 60a, a charger 59a, a first developing device 64a, a second developing device 65a, a third developing device 66a, an intermediate transfer drum 61a, a cleaner 58a, a transfer device 63a, a fixer 62a, a stacking tray 55 and a sheet cassette 70.

The charger 59a uniformly charges the surface of the rotatable photosensitive drum 60a. A laser beam emitted from the laser unit 56 is reflected by the polygonal mirror 57a which is rotated so that the laser beam scans the surface of the photosensitive drum 60a which has been uniformly charged. The first developing device 64a, the second developing device 65a and the third developing device 66a are respectively provided with yellow toner (Y), magenta toner (M) and cyan toner (C), and develop, using the toner, an electrostatic latent image formed on the photosensitive drum 60a by the scanning of the laser beam.

The intermediate transfer drum 61a is located adjacent to the photosensitive drum 60 so that toner images formed by the respective developing devices 64a, 65a and 66a are transferred from the photosensitive drum 60a to the intermediate transfer drum 61a. The electrophotographic process (including a charging step using the charger 59a, an exposure step using the laser beam and a developing step using the developing device) is repeatedly executed three times while switching a used developing device among the first, second and third developing devices 64a, 65a and 66a. As a result, a yellow toner image, a magenta toner image and a cyan toner image are successively transferred from the photosensitive drum 60a to the intermediate transfer drum 61a. The yellow toner image, the magenta toner image and the cyan toner image are overlapped, so that a color image is formed on the intermediate transfer drum 61a.

The color image is transferred from the intermediate transfer drum 61a to a recording sheet fed from the sheet cassette 70 by the transfer device 63a. The color image formed on the recording sheet is fixed by the fixer 62a, and the recording sheet is then ejected to the stacking tray 55.

The control system has an interface 50, a printer control circuit 51, a page memory 52, a laser driving control circuit 53 and a sequence control circuit 54. The control system further has a first developing device driving circuit 64b (Y), a second developing device driving circuit 65b (M), a third developing device driving circuit 66b (C), a charger driving circuit 59b, a polygon mirror driving circuit 57b, a fixer driving circuit 62b, an intermediate transfer drum driving circuit 61b, an intermediate transfer circuit 61c, a transfer device driving circuit 63b, a cleaner driving circuit 58b, a photosensitive drum driving circuit 60b, a sheet feed mechanism driving circuit 67b and a detecting circuit 68. Operations of these circuits are controlled by the sequence control circuit 54.

The interface 50 is connected to a host unit (e.g., a personal computer), and outputs a ready signal S1 indicating whether the color laser printer is in a ready state where print data can be received. The print data from the host unit is supplied to the page memory 52 via the interface 50 and the printer control circuit 51. The printer controller 51 controls the interface 50, processing of the print data, the page memory 52 and the sequence controller 54. Image data obtained from the print data by the printer control circuit 51 is stored in the page memory 52.

The laser driving control circuit 53 controls the laser unit 56 based on the image data stored in the page memory 52 so that the laser beam modulated in accordance with the image data is emitted by the laser unit 56. The first developing device driving circuit (Y) 64b, the second developing device driving circuit (M) 65b and the third developing device driving circuit (C) 66b respectively output driving signals used to drive the first, second and third developing devices 64a, 65a and 66a. The charger driving circuit 59b outputs a driving signal used to drive the charger 59a which uniformly charges the photosensitive drum 60a at a predetermined initial potential.

The polygonal mirror driving circuit 57b outputs a polygon driving signal used to rotate the polygonal mirror 57a at a constant speed. The fixer driving circuit 62b outputs a fixer driving signal used to drive the fixer 62a so that the fixer 62a is maintained at a predetermined temperature. The intermediate transfer drum driving circuit 61b outputs a driving signal used to rotate the intermediate transfer drum 61a in a stable state. The intermediate transfer circuit 61c outputs a control signal used for instruction to transfer a toner image from the photosensitive drum 60a to the intermediate transfer drum 61a. The transfer device driving circuit 63b outputs a transfer signal used to drive the transfer device 63a so that the transfer device 63a outputs a voltage required for transferring of the color image from the intermediate transfer drum 61a to a recording sheet.

The cleaner driving circuit 58b outputs a cleaner driving signal used to rotate the cleaner 58a in a stable state. The photosensitive drum driving circuit 60b outputs a driving signal used to rotate the photosensitive drum 60a. The sheet feed mechanism driving circuit 67b outputs a sheet feed signal used to control a sheet feed mechanism 67a for feeding a recording sheet from the sheet cassette 70 to the stacking tray 55. The detecting circuit 68 detects a rotation angle of the photosensitive drum 60a and outputs a detecting signal.

Figure 5:
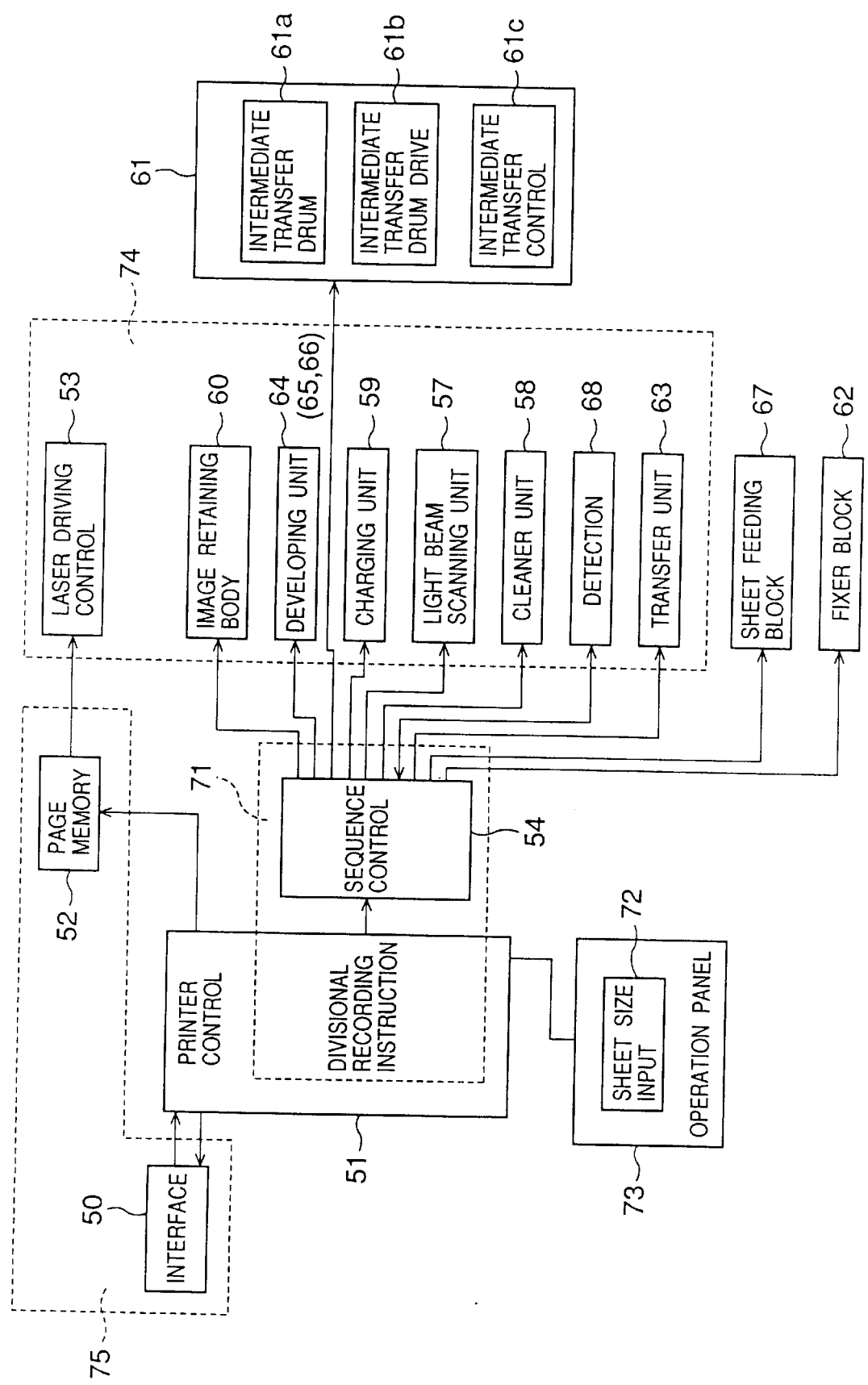
FIG. 5 is a block diagram illustrating the laser printer according to the first and second embodiments of the present invention.

The color laser printer having the above structure is represented by functional blocks as shown in FIG. 5.

Referring to FIG. 5, the color laser printer has a data supply block 75, an image forming block 74, an intermediate recording block 61, a sheet feeding block 67, a divisional recording instruction block 71, a sheet size input block 72 and a fixing block 62. The data supply block 75 is controlled by the printer control circuit 51 and supplies image data to the image forming block 74. The data supply block 75 includes the interface 50 and the page memory 52 shown in FIG. 4. The image forming block 74 repeatedly executes an image forming process (the electrophotographic process) based on image data supplied from the data supply block 74 a plurality of times (three times) so that images (a yellow toner image, a magenta toner image and a cyan toner image) are formed in the respective times. The image forming block 74 includes the laser driving control circuit 53 shown in FIG. 4, an image retaining body 60, a developing unit 64 (65, 66), a charging unit 59, a light beam scanning unit 57, a cleaner unit 58, the detecting circuit 68 and a transfer unit 63. The image retaining body 60 corresponds to the photosensitive drum 60a and the photosensitive drum driving circuit 60b. The developing unit 64 (65, 66) corresponds to the first, second and third developing devices 64a, 65a and 66a and first, second and third developing device driving circuits 64b, 65b and 66b. The charging unit 59 corresponds to the charger 59a and the charger driving circuit 59b. The light beam scanning unit 57 corresponds to the polygonal mirror 57a and the polygon driving circuit 57b. The cleaner unit 58 corresponds to the cleaner 58a and the cleaner driving circuit 58b. The transfer unit 63 corresponds to the transfer device 63a and the transfer device driving circuit 63b.

The intermediate recording block 61 includes the intermediate transfer drum 61a, the intermediate transfer drum driving circuit 61b and the intermediate transfer circuit 61c. The images formed by the image forming block 74 are overlapped in the intermediate transfer drum 61a of the intermediate recording block 61 so that a color image is temporarily retained by the intermediate transfer drum 61a. The color image is then transferred from the intermediate transfer drum 61a to a recording sheet by the transfer unit 63.

The sheet feeding block 67 corresponds to the sheet feeding mechanism 67a and the sheet feeding mechanism driving circuit 67b. The fixer block 62 corresponds to the fixer 62a and the fixer driving circuit 62b.

The sheet size input block 71 is provided on an operation panel 73. A size of a recording sheet is input to the color laser printer using the sheet size input block 72.

The divisional recording instruction block 71 is formed by the functions of the printer control circuit 51 and the sequence control circuit 54. The divisional recording instruction block 71 divides an area having a size (e.g., A3) input by the sheet size input block 72 into area segments each of which corresponds to a size (e.g., A4) of an image capable of being transferred to the intermediate transfer drum 61a. The divisional recording instruction block 71 controls the data supply block 75 so that image data to be printed is divided into image data segments corresponding to the above area segments and the image data segments are separately supplied to the image forming block 74 at predetermined intervals. The divisional recording instruction block 71 further controls the sheet feeding block 67 so that a recording sheet is fed and is stopped from completion of transfer of a color image segment corresponding to an image data segment to the starting of transfer of the next color image segment corresponding to the next image data segment.

A description will now be given, with reference to FIGS. 6A, 6B, 7A, 7B, 7C, 7D, and 8, of operations of the color laser printer having the above structure.

An operator inputs a size (e.g, A3) of a recording sheet using the sheet size input block 72 on the operation panel 73. As shown in FIG. 8, the host unit (e.g., the personal computer) connected to the color laser printer supplies image data S2 to the color laser printer when detecting a ready signal S1 from the color laser printer.

When an image data segment (e.g., corresponding to a size of A4) is stored in the page memory 52 as shown in FIG. 7A, the divisional recording instruction block 71 controls the interface 50 so that the ready signal S1 is made inactive. As a result, the host unit stops supplying image data to the color page printer. The sequence control circuit 54 controls the image forming block 74 in a state where the electrophotographic process can be executed. That is, a polygon driving signal S3 supplied to the light beam scanning unit 57, a cleaner driving signal S4 supplied to the cleaner unit 58, a charger driving signal S5 supplied to the charging unit 59, a fixer driving signal S7 supplied to the fixer block 62, a photosensitive drum driving signal S8 supplied to the photosensitive drum 60a and an intermediate transfer drum driving signal S6 supplied to the intermediate transfer drum 61a are activated by the sequence control circuit 54.

In this state, the printer control circuit 51 controls the data supply block 75 so that a cyan component of the image data segment stored in the page memory is supplied to the laser driving control circuit 53. The printer control circuit 51 then supplies a start instruction to the sequence control circuit 54. The laser unit 56 converts image data (the cyan component of the image data segment) into a laser exposure signal S13. The laser beam emitted from the laser unit 56, driven in accordance with the laser exposure signal S13, is directed to the photosensitive drum 60a by the light beam scanning unit 57 and scans the photosensitive drum 60a which is uniformly charged by the charging unit 59. As a result, an electrostatic latent image corresponding to the cyan component of the image data segment is formed on the photosensitive drum 60a.

The sequence control circuit 54 counts clock pulses S9 (the detecting signal) from the detecting circuit 68 starting from a time at which the start instruction is supplied from the printer control circuit 51 so as to check a rotation angle of the photosensitive drum 60a. When the sequence control circuit 54 determines, based on the count value of the clock pulses S9 from the detecting circuit 68, that the electrostatic latent image reaches the third developing device 66a (including the cyan toner), the third developing device driving circuit (C) 66b activates a cyan developing signal S10 based on an instruction from the sequence control circuit 54. As a result, the third developing device 66a develops the electrostatic latent image, so that the cyan toner image is formed on the photosensitive drum 60a. After this, when the sequence control circuit 54 determines the cyan toner image reaches the intermediate transfer drum 61a, the intermediate transfer circuit 61c activates an intermediate transfer signal S14 based on an instruction from the sequence control circuit 54. As a result, the cyan toner image is transferred from the photosensitive drum 60a to the intermediate transfer drum 61a.

After this, a magenta component of the image data segment stored in the page memory 52 and a yellow component are successively supplied to the laser driving control circuit 53. A magenta toner image and a yellow toner image are successively formed on the photosensitive drum 60a based on a magenta developing signal S11 and a yellow developing signal S12 in the same manner as the cyan toner image. Further, the magenta toner image and the yellow toner image are successively transferred from the photosensitive drum 60a to the intermediate transfer drum 61b based on the intermediate transfer signal S14 in the same manner as the cyan toner image. As a result, the cyan toner image, the magenta toner image and the yellow toner image are overlapped so that a color image segment corresponding to the image data segment is formed on the intermediate transfer drum 61a.

Figure 6A:
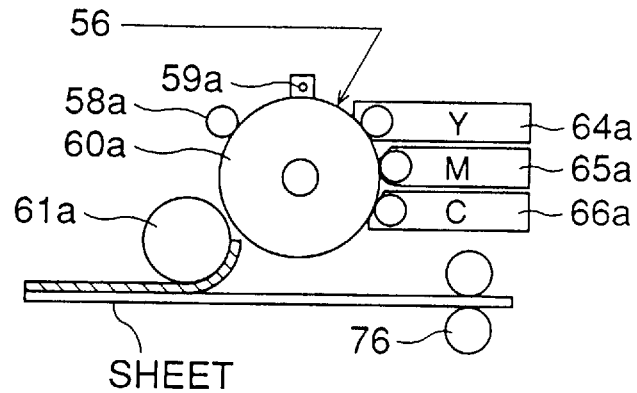
FIGS. 6A and 6B are diagrams illustrating states of a recording sheet in the laser printer according to the first embodiment of the present invention.

The sheet feed mechanism driving circuit 67b activates a sheet feeding signal S15, so that a recording sheet is fed from the sheet cassette 70 toward the intermediate transfer drum 61a by the sheet feed mechanism 67a. When the recording sheet reaches the intermediate transfer drum 61a, the transfer device driving circuit 63b activates a transfer signal S16 based on an instruction from the sequence control circuit 54. As a result, while the recording sheet is passing between the intermediate transfer drum 61a and the transfer device 63a, the color image segment is transferred from the intermediate transfer drum 61a to the recording sheet, as shown in FIGS. 6A and 7B.

When the sequence control circuit 54 determines, based on the count value of the pulse signals from the detecting circuit 68, that the color image segment is completely transferred from the intermediate transfer drum 63a to the recording sheet, the transfer signal S16 from the transfer device driving circuit 63b is made inactive based on an instruction from the sequence control circuit 54. At this time, the sheet feeding signal S15 from the sheet feed mechanism driving circuit 67b is made inactive. As a result, the recording sheet is stopped from being fed by the sheet feed mechanism 67a. The sequence control circuit 54 then supplies to the printer control circuit 51 information indicating that the recording sheet is stopped.

When the printer control circuit 51 receives the information, the ready signal S1 is activated to receive the remaining image data S2 from the host unit. The remaining image data S2 is received by the printer control circuit 51 and supplied from the printer control circuit 51 to the page memory 52. When the next image data segment (corresponding to an image capable of being transferred to the intermediate transfer drum 61a, e.g., an A4 size image) is stored in the page memory 53, the ready signal S1 is made inactive.

Figure 6B:
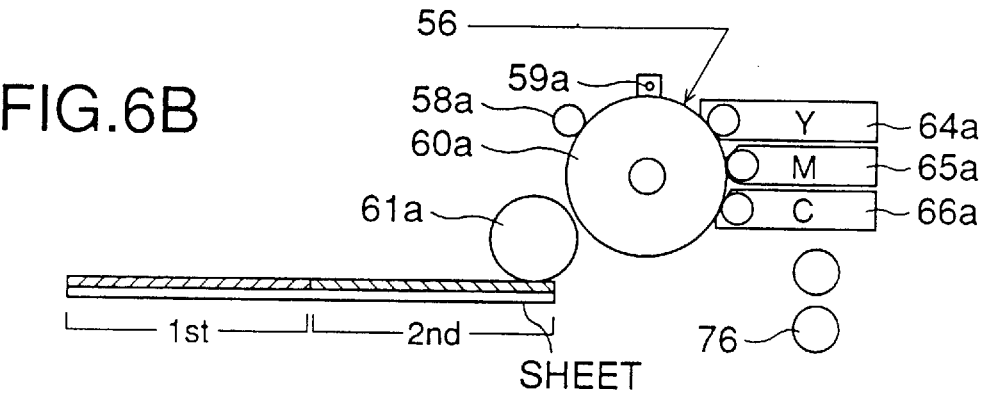

The electrophotographic process using the next image data segment is repeatedly executed three times in the same manner as in the above case, so that a color image segment corresponding to the next image data segment is formed in the intermediate transfer drum 61a. When the color image segment is completely formed on the intermediate transfer drum 61a, the sheet feed mechanism driving circuit 67b and the transfer device driving circuit 63b simultaneously activate the sheet feeding signal S15 and the transfer signal S16. As a result, the recording sheet to be fed is restarted by the sheet feed mechanism 67a and the color image segment corresponding to the next image data segment is transferred from the intermediate transfer drum 61a to the recording sheet, as shown in FIGS. 6B and 7C. The color image segment corresponding to the next image data segment is formed on the recording sheet such that the trailing edge of the previous color image segment is in contact with the leading edge of the color image segment corresponding to the next image data segment.

The above operations are repeated until a color image segment corresponding to the last image data segment is formed on the recording sheet. For example, in a case where color image segments each having a size of A4 are formed on a recording sheet having a size of A3, the above operations are repeated twice. After the color image segment corresponding to the last image data segment is completely formed on the recording sheet, the recording sheet is continuously fed. A color image in which a plurality of color image segments are connected is fixed on the recording sheet by the fixer 62a. The recording sheet is then ejected to the stacking tray 55.

A description will now be given of a second embodiment of the present invention.

A color laser printer according to the second embodiment has the printing mechanism and the control system having the same structure as those shown in FIG. 4. and has the same functional blocks as in the first embodiment (see FIG. 5). However, capacity of a page memory 152 and operations of a divisional recording instruction block 171 in the second embodiment differ from those in the first embodiment described above.

In the second embodiment, the capacity of the page memory 152 is less than the amount of image data representing an image which can be transferred to the intermediate transfer drum 61a. Thus, a size of each of the area segments into which an area corresponding to a recording sheet should be divided depends on the capacity of the page memory 152 (does not depend on the size of an image capable of being transferred to the intermediate transfer drum 61a).

A description will now be given, with reference to FIGS. 9A, 9B, 9C, 9D and 10, of operations of the color laser printer of the second embodiment.

An operator inputs a size of a recording sheet on which a color image should be printed using a sheet size input block 72 on an operation panel 73. After this, the color printer starts the operations. The ready signal S1 is activated, and color image data S2 from the host unit is received via the interface 50. The color image data is stored in the page memory 152. When the entire area of the page memory 152 is used to store the color image data, the printer control circuit 51 controls the interface 50 so that the ready signal S1 is made inactive to interrupt transmission of the color image data from the host unit (see FIG. 9A and an interval (a) in FIG. 10). In this state, an image data segment which is a part of the color image data for one page having the size input by the user is stored in the page memory 152.

After this, the sequence control circuit 54 controls the image forming block 74 in a state where the electrophotographic process can be executed. That is, the polygon driving signal S3 supplied to the light beam scanning unit 57, the cleaner driving signal S4 supplied to the cleaner unit 58, the charger driving signal S5 supplied to the charging unit 59, the fixer driving signal S7 supplied to the fixer block 62, the photosensitive drum driving signal S8 supplied to the photosensitive drum 60a and the intermediate transfer drum driving signal S6 supplied to the intermediate transfer drum 61a are activated by the sequence control circuit 54.

In this state, the printer control circuit 51 controls the data supply block 75 so that a cyan component of the image data segment stored in the page memory 152 is supplied to the laser driving control circuit 53. The printer control circuit 51 then supplies a start instruction to the sequence control circuit 54. The laser unit 56 converts image data (the cyan component of the image data segment) into a laser exposure signal S13. The laser beam emitted from the laser unit 56 is directed to the photosensitive drum 60a by the light beam scanning unit 57 and scans the photosensitive drum 60a uniformly charged by the charging unit 59. As a result, an electrostatic latent image corresponding to the cyan component of the image data segment is formed on the photosensitive drum 60a.

The sequence control circuit 54 counts clock pulses S9 (the detecting signal) from the detecting circuit 68 starting from a timing at which the start instruction is supplied from the printer control circuit 51 so as to check a rotation angle of the photosensitive drum 60a. When the sequence control circuit 54 determines that the electrostatic latent image reaches the third developing device 66a (including the cyan toner), the third developing device driving circuit (C) 66b activates a cyan developing signal S10 based on an instruction from the sequence control circuit 54. As a result, the third developing device 66a develops the electrostatic latent image, so that the cyan toner image is formed on the photosensitive drum 60a. After this, when the sequence control circuit 54 determines the cyan toner image reaches the intermediate transfer drum 61a, the intermediate transfer circuit 61c activates an intermediate transfer signal S14 based on an instruction from the sequence control circuit 54. As a result, the cyan toner image is transferred from the photosensitive drum 60a to the intermediate transfer drum 61a.

After this, a magenta toner image and a yellow toner image are successively formed on the photosensitive drum 60a based on a magenta developing signal S11 and a yellow developing signal S12 in the same manner as the cyan toner image. Further, the magenta toner image and the yellow toner image are successively transferred from the photosensitive drum 60a to the intermediate transfer drum 61b based on the intermediate transfer signal S14 in the same manner as the cyan toner image. As a result, the cyan toner image, the magenta toner image and the yellow toner image are overlapped so that a color image segment corresponding to the image data segment is formed on the intermediate transfer drum 61a (see interval (b) in FIG. 10).

The sheet feed mechanism driving circuit 67b activates a sheet feeding signal S15, so that a recording sheet is fed from the sheet cassette 70 toward the intermediate transfer drum 61a by the sheet feed mechanism 67a. When the recording sheet reaches the intermediate transfer drum 61a, the transfer device driving circuit 63b activates a transfer signal S16 based on an instruction from the sequence control circuit 54. As a result, while the recording sheet is passing between the intermediate transfer drum 61a and the transfer device 63a, the color image segment is transferred from the intermediate transfer drum 61a to the recording sheet, as shown in FIGS. 9B.

When the sequence control circuit 54 determines that the color image segment is completely transferred from the intermediate transfer drum 63a to the recording sheet, the transfer signal S16 from the transfer device driving circuit 63b is made inactive based on an instruction from the sequence control circuit 54. At this time, the sheet feeding signal S15 from the sheet feed mechanism driving circuit 67b is made inactive. As a result, the recording sheet is stopped from being fed by the sheet feed mechanism 67a. The sequence control circuit 54 then supplies to the printer control circuit 51 information indicating that the recording sheet is stopped.

When the printer control circuit 51 receives the information, the ready signal S1 is activated to receive the remaining image data S2 from the host unit. When the next image data segment is stored in the page memory 152, the ready signal S1 is made inactive. Also the amount of the next image data is less than the amount of image data representing an image capable of being transferred to the intermediate transfer drum 61a.

The electrophotographic process using the next image data segment is repeatedly executed three times in the same manner as in the above case, so that a color image segment corresponding to the next image data segment is formed in the intermediate transfer drum 61a. When the color image segment is completely formed on the intermediate transfer drum 61a, the sheet feed mechanism driving circuit 67b and the transfer device driving circuit 63b simultaneously activate the sheet feeding signal S15 and the transfer signal S16. As a result, the recording sheet to be fed by the sheet feed mechanism 67a is restarted and the color image segment corresponding to the next image data segment is transferred from the intermediate transfer drum 61a to the recording sheet, as shown in FIGS. 9C. The color image segment corresponding to the next image data segment is formed on the recording sheet such that the trailing edge of the previous color image segment is in contact with the leading edge of the color image segment corresponding to the next image data segment.

Figure 10:
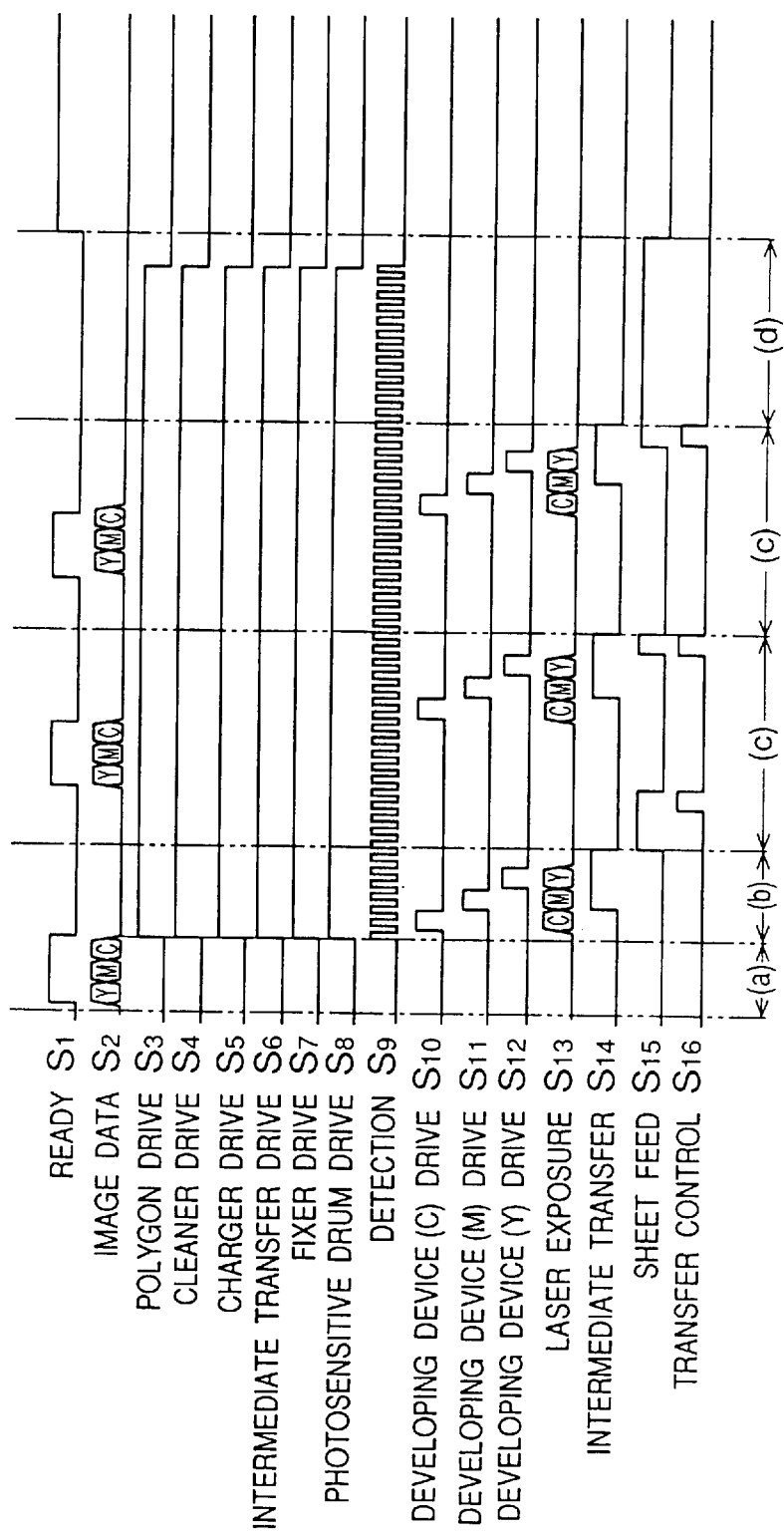
FIG. 10 is a timing chart illustrating states of signals used for operations of the laser printer according to the second embodiment of the present invention.

The above operations are repeated until a color image segment corresponding to the last image data segment is formed on the recording sheet (see intervals (c) in FIG. 10). After the color image segment corresponding to the last image data segment is completely formed on the recording sheet, the recording sheet is continuously fed. A color image in which a plurality of color image segments are connected is fixed on the recording sheet by the fixer 62a (see FIG. 9D and an interval (d) in FIG. 10). The recording sheet is then ejected to the stacking tray 55.

According to the second embodiment of the present invention, even if the page memory has a small capacity, a color image having a large size can be formed on a recording sheet.

A description will now be given of a third embodiment of the present invention.

Figure 11:
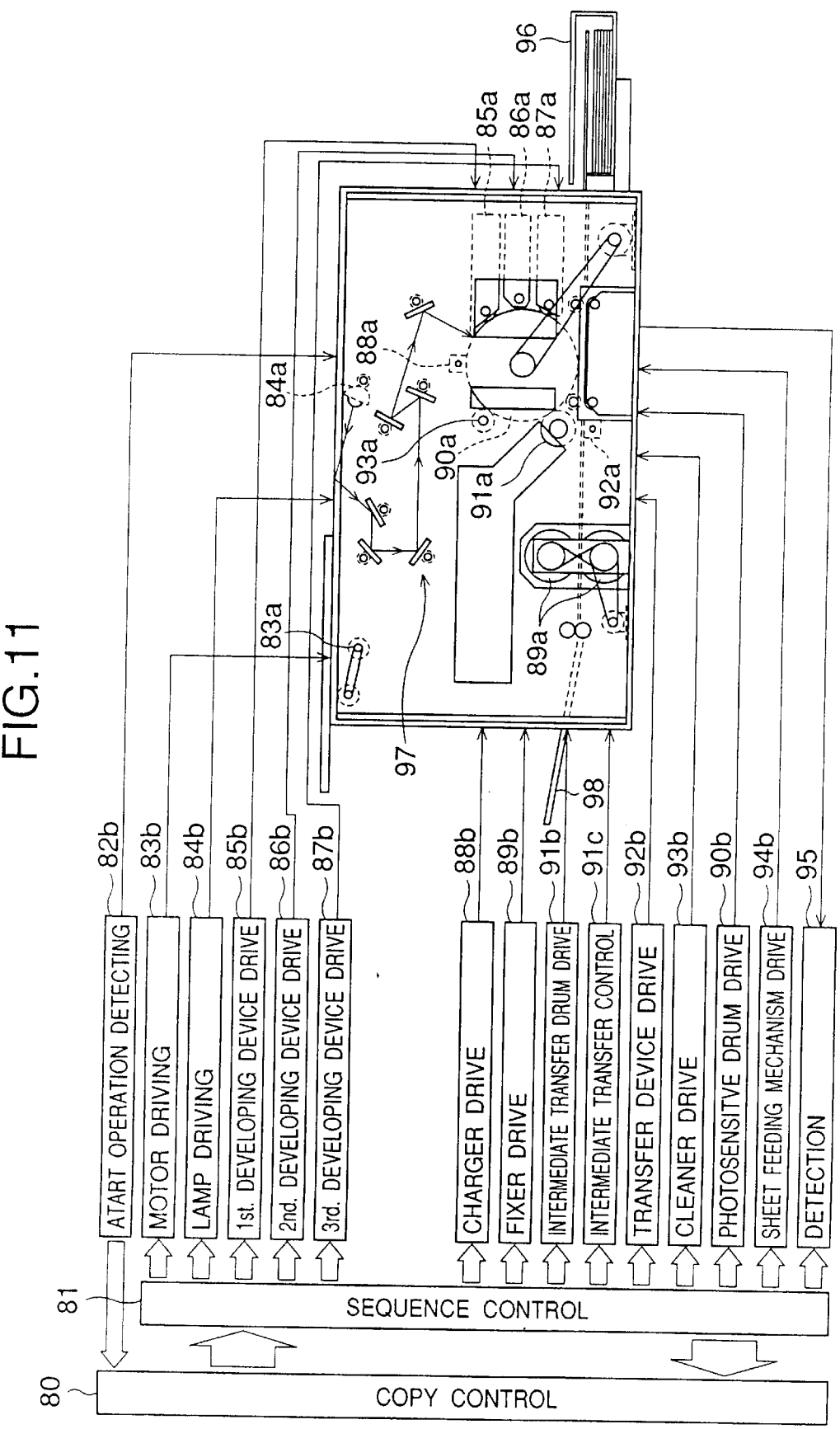
FIG. 11 is a diagram illustrating a mechanism and a control system for a copy machine according to a third embodiment of the present invention.

A color copy machine according to the third embodiment of the present invention has a copying mechanism and a control system as shown in FIG. 11. Referring to FIG. 11, the copying mechanism has a motor 83a, a lamp unit 84a, an optical system 97 including mirrors, a photosensitive drum 90a, a charger 88a, a first developing device 85a, a second developing device 86a, a third developing device 87a, a sheet cassette 96, an intermediate transfer drum 91a, a transfer device 92a, a fixer 89a and a stacking tray 98. The driving motor 83a moves a document stage on which a document is set. The lamp unit 84a irradiates the document on the document stage. Light of the lamp unit 84a can be switched to red, green and blue. The optical system 97 leads reflected light from the document to the photosensitive drum 90a. The charger 88a uniformly charges the photosensitive drum 90a. The uniformly charged photosensitive drum 90a is exposed by the light, so that an electrostatic latent image corresponding to the document is formed on the photosensitive drum 90a. The first developing device 85a develops the electrostatic latent image so that a yellow toner image is formed. The second developing device 86a develops the electrostatic latent image so that a magenta toner image is formed. The third developing device 87a develops the electrostatic latent image so that a cyan toner image is formed. The sheet cassette 96 is provided with recording sheets stacked therein, and recording sheets are fed from the sheet cassette 96 toward the stacking tray 98 via the photosensitive drum 90a, the intermediate transfer drum 91a and the fixer device 89a. The intermediate transfer drum 91a retains toner images transferred from the photosensitive drum 90a. A color image formed on the intermediate transfer drum 61a is transferred to a recording sheet by the transfer device 92a. The color image transferred to the recording sheet is fixed thereon by the fixer device 89a.

The control system of the color copy machine has a copy control circuit 80, a sequence control circuit 81, a start operation detecting circuit 82b, a motor driving circuit 83b, a lamp driving circuit 84b, a first developing device driving circuit (Y) 85b, a second developing device driving circuit (M) 86b, a third developing device driving circuit (C) 87b, a charger driving circuit 88b, a fixer driving circuit 89b, an intermediate transfer drum driving circuit 91b, an intermediate transfer control circuit 91c, a transfer device driving circuit 92b, a cleaner driving circuit 93b, a photosensitive drum driving circuit 90b, a sheet feeding mechanism driving circuit 94b and a detecting circuit 95. The copy control circuit 80 has functions for detecting a start operation of an operator, for controlling a reading operation of a document and for controlling the copying mechanism. The start operation detecting circuit 82b outputs a copy start signal when a copy start button is operated by the operator. The motor driving circuit 83b outputs a control signal used to drive the motor 83a so that the document stage is moved. While the document stage is being moved, a document on the document stage is scanned by the light from the lamp unit 84a. The lamp driving circuit 84b outputs a lamp driving signal used to drive the lamp unit 84a. The photosensitive drum driving circuit 90b outputs a driving signal for the photosensitive drum 90a. The detecting circuit 95 outputs a pulse signal used for detecting a rotation angle of the photosensitive drum 90a.

The first developing device driving circuit 85b, the second developing device driving circuit 86b and the third developing device driving circuit 87b respectively output driving signals for the first, second and third developing devices 85a, 86a and 87a. The charger driving circuit 88b outputs a charger driving signal used to drive the charger 88a so that the photosensitive drum 90a is charged at an initial potential. The fixer driving circuit 89b outputs a fixer driving signal used to maintain the fixer device 89a at a predetermine temperature. The intermediate drum driving circuit 91b outputs a driving signal used to rotate the intermediate transfer drum 91a in a stable state.

Further, the intermediate transfer control circuit 91c outputs a control signal used to transfer a toner image to the intermediate transfer drum 91a. The transfer device driving circuit 92b outputs a transfer signal used to drive the transfer device 92a so that a color image is transferred from the intermediate transfer drum 91a to a recording sheet. The cleaner driving circuit 93b outputs a cleaner driving signal used to drive the cleaner 93a in a stable state. The sheet feeding mechanism driving circuit 94b outputs a sheet feeding signal used to control a sheet feeding mechanism which feeds a recording sheet from the sheet cassette 96 to the stacking tray 98. The sequence control circuit 81 controls the above circuits to operate in a predetermined sequence.

Figure 12:
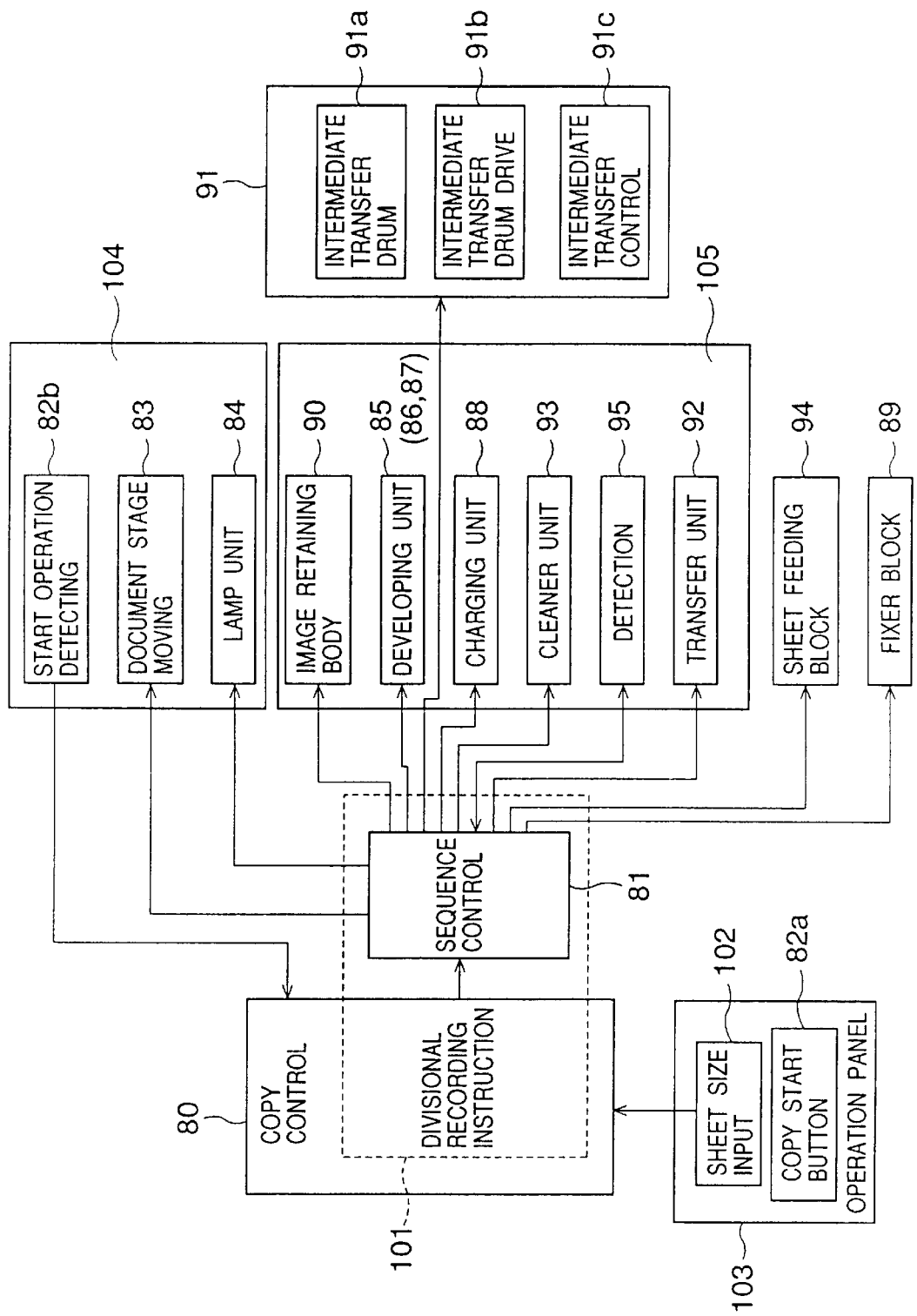
FIG. 12 is a block diagram illustrating the copy machine according to the third embodiment of the present invention.

The color copy machine having the above structure is represented by functional blocks as shown in FIG. 12.

Referring to FIG. 12, the color copy machine has a color image reading block 104, an image forming block 105, an intermediate recording block 91, a sheet feeding block 94, a fixer unit 89, a divisional recording instruction block 101 and a sheet size input block 102. The color image reading block 104 includes the start operation detecting circuit 82b, the lamp unit 84 and a document stage moving unit 83 (corresponding to the motor 83a). While the document stage on which a document is set is being moved by the document stage moving unit 83, the lamp unit 84 irradiates the document. The light from the lamp unit 84 is switched to each of primaries (e.g., read, blue and green). Reflected light of each of the primaries on the document is supplied, as image information representing the document, to the image forming block 105.

The image forming block 105 which receives the reflected light repeatedly executes the electrophotographic process a plurality of times (e.g., three times), so that images corresponding to respective primaries are formed. The image forming block 105 has an image retaining unit 90, a developing unit 85 (86, 87), a charging unit 88, a cleaner unit 93, the detecting circuit 95 and a transfer unit 92. The image retaining unit 90 includes the photosensitive drum 90a and the photosensitive drum driving circuit 90b. The developing unit 85 (86, 87) corresponds to the developing devices 85a, 86a and 87a and the developing device driving circuit 85b, 86b and 87b. The charging unit 88 corresponds to the charger 88a and the charger driving circuit 88b. The cleaner unit 93 corresponds to the cleaner 93a and the cleaner driving circuit 93b. The transfer unit 92 corresponds to the transfer device 92a and the transfer device driving circuit 92b.

The images formed by the image forming block 104 are transferred to and overlapped on the intermediate transfer drum 91a included in the intermediate recording unit 91. The intermediate recording unit 91 further includes the intermediate transfer drum driving circuit 91b and the intermediate transfer control circuit 91c. As a result, a color image is formed on the intermediate transfer drum 91a. The color image is transferred from the intermediate transfer drum 91a to a recording sheet by the transfer unit 92.

The sheet feeding unit 94 corresponds to the sheet feeding mechanism 94a and the sheet feeding mechanism driving circuit 94b. The fixer unit 89 corresponds to the fixer 89a and the fixer driving circuit 89b.

The sheet size input block 102 is provided on an operation panel 103. The size of a recording sheet is input to the color copy machine using the sheet size input block 102. The operation panel 103 is further provided with a copy start button 82a.

The divisional recording instruction block 101 is formed of functions of the copy control circuit 80 and the sequence control circuit 81. The divisional recording instruction block 101 divides an area having a size input by the sheet size input block 102 into area segments each of which is corresponding to a size of an image capable of being transferred to the intermediate transfer drum 61a. The divisional recording instruction block 71 then controls the color image reading block 104 so that the color image reading block 104 scans the document, area segment by area segment, until an area corresponding to the size input by the size input block 102 is completely scanned. While the color image reading block 104 is scanning the document, the reflected light on the document is supplied, as image information, to the image forming block 105. The image forming block 105 forms toner images based on the image information from the color image reading block 104. The divisional recording instruction block 101 further controls the sheet feeding block 94 so that a recording sheet is fed and is stopped from completion of transfer of a color image segment corresponding to an area segment to starting of transfer of a color image segment corresponding to the next area segment.

A description will now be given, with reference to FIGS. 13, 14A, 14B, 14C and 14D, of operations of the color copy machine of the third embodiment.

A document is set on the document stage, and an operator operates the copy start button 82a. The start operation detecting circuit 82b thus outputs a copy signal S31. The copy control circuit 80 which receives the copy signal S31 controls the sequence control circuit 81 so that the color copy machine is brought to a state where the electrophotographic process can be executed.

Figure 14A:
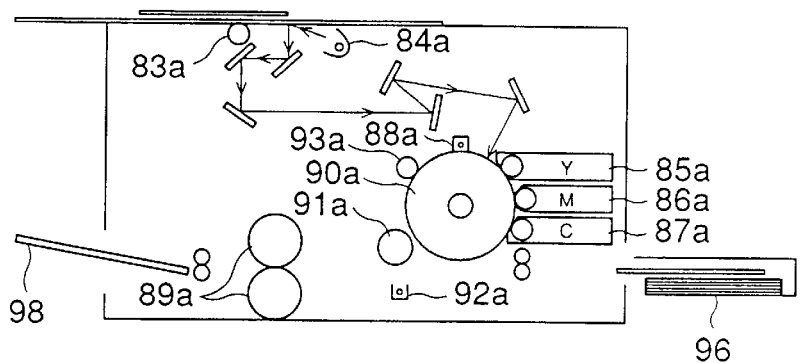
FIGS. 14A, 14B, 14C and 14D are diagrams illustrating operations of the copy machine according to the third embodiment of the present invention.

That is, the cleaner driving signal S35 supplied to the cleaner unit 93, the charger driving signal S36 supplied to the charging unit 89, the fixer driving signal S38 and the photosensitive drum driving signal S39 supplied to the image retaining unit 90 are activated. In this state, the copy control circuit 80 activates a lamp-on signal S32, so that the document is irradiated by red light from the lamp unit 84, as shown in FIG. 14A. The sequence control circuit 81 controls the document stage moving unit 83 (the motor 83b) so that the document stage is moved. While the document stage is being moved, the document is scanned by the red light. The reflected light from the document is transmitted, by the optical system 97, to the photosensitive drum 90a which has been uniformly charged by the charger 88a. As a result, an electrostatic latent image having a size corresponding to an area segment is formed on the photosensitive drum 90a.

The sequence control circuit 81 counts clock pulses from the detecting circuit 95 starting from a time at which a recording start instruction is received from the copy control circuit 80 so that a rotation angle of the photosensitive drum 90a is checked. When the sequence control circuit 81 determines, based on the count value, that the electrostatic latent image on the photosensitive drum 90a reaches the third developing device 87a, a cyan developing signal S41 (the driving signal for the third developing device 87a) is activated. As a result, the electrostatic latent image is developed by the third developing device 87a so that a cyan toner image is formed on the photosensitive drum 90a. After this, when the sequence control circuit 81 determines that the rotation angle of the photosensitive drum 90a reaches a value at which the cyan toner image is to be transferred to the intermediate transfer drum 91a, the sequence control circuit 81 controls the intermediate transfer control circuit 91c so that the intermediate transfer control signal S44 is activated. As a result, the cyan toner image is transferred from the photosensitive drum 90a to the intermediate transfer drum 91a.

When the copy control circuit 80 determines that the red light has completely scanned the area corresponding to the area segment which depends on an area of an image capable of being transferred to the intermediate transfer drum 91a, the motor 83a is stopped and reversed so that the document stage is returned to a copy starting position.

After this, the same area of the document is repeatedly scanned by using green light and blue light from the lamp unit 84. An electrostatic latent image formed by scanning of the green light is developed by the second developing device 86a so that a magenta toner image is formed on the photosensitive drum 90a, in the same manner as the cyan toner image. The magenta toner image is then transferred from the photosensitive drum 90a to the intermediate transfer drum 91a. An electrostatic latent image formed by scanning of the blue light is developed by the first developing device 85a so that a yellow toner image is formed on the photosensitive drum 90a, in the same manner as the cyan toner image. The yellow toner image is then transferred from the photosensitive drum 90a to the intermediate transfer drum 91a. As a result, the cyan toner image, the magenta toner image and the yellow toner image are overlapped on the intermediate transfer drum 91a so that a color image segment having a size corresponding to the area segment is formed on the intermediate transfer drum 91a.

When the color image segment is completely formed on the intermediate transfer drum 91a, the sequence control circuit 81 controls the sheet feeding unit 94 (the sheet feeding signal S45 is activated) so that a recording sheet is fed from the sheet cassette 96 toward the intermediate transfer drum 91*a*. The transferring signal S46 is then activated, so that the color image segment is transferred to the recording sheet by the transfer device 92*a*, as shown in FIG. 14B (see interval (a) in FIG. 13).

Figure 13:
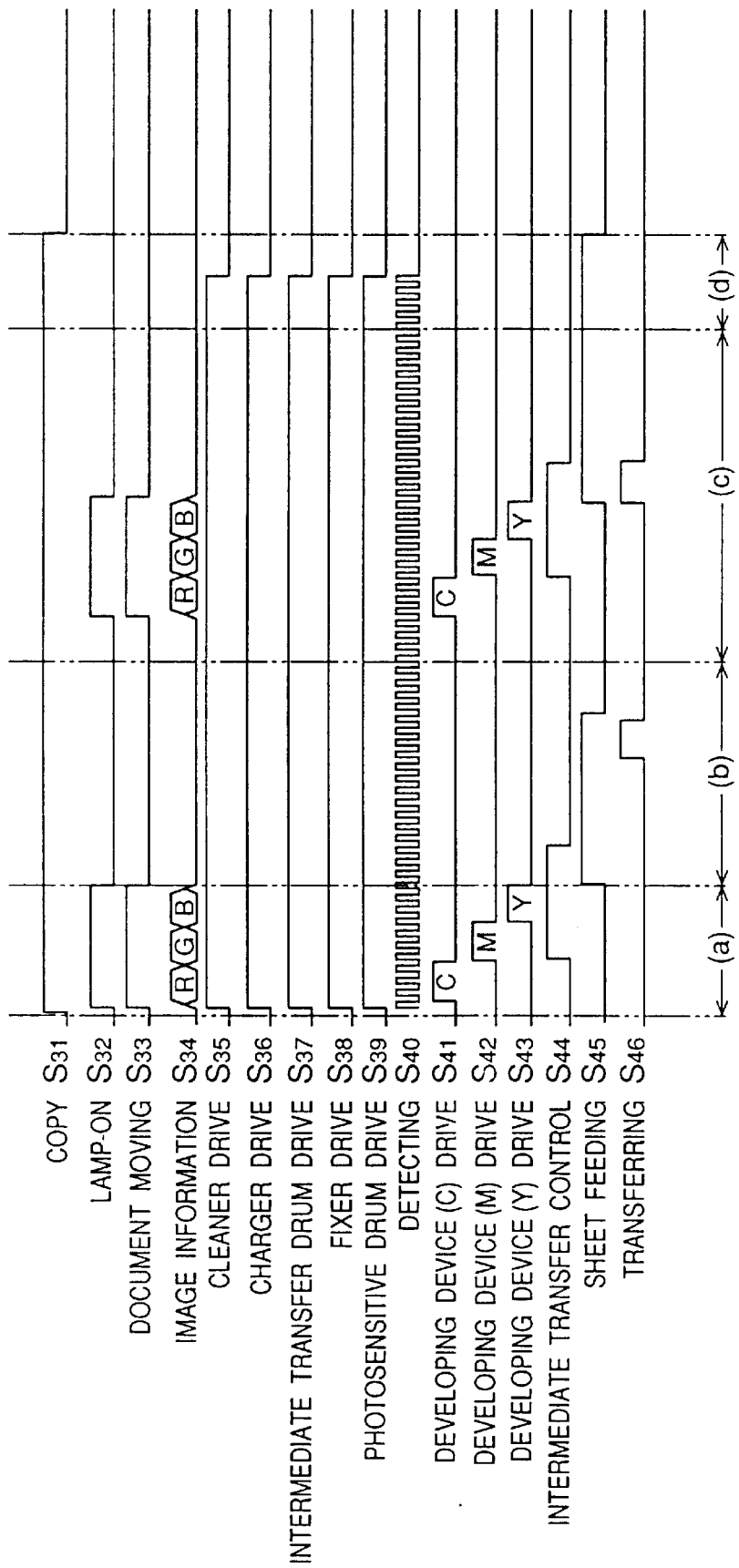
FIG. 13 is a timing chart illustrating states of signals used for operations of the copy machine according to the third embodiment of the present invention.
Figure 14B:
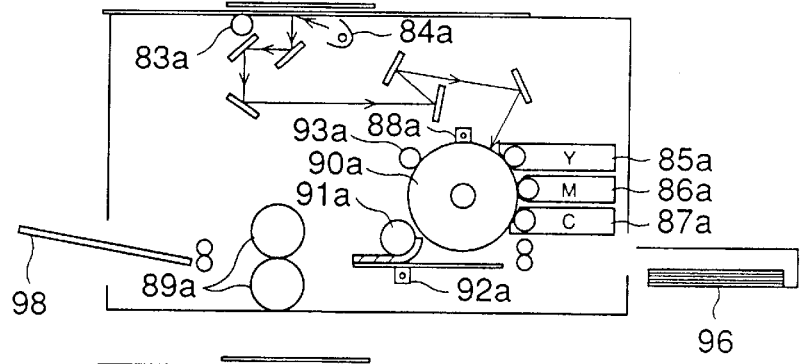

When the color image segment is completely transferred to the recording sheet, the sheet feeding signal S45 and the transferring signal S46 are made inactive (see an interval (b) in FIG. 13). As a result, the recording sheet on which the color image segment is formed is stopped. The sequence control circuit 81 supplies to the copy control circuit 80 information indicating that the recording sheet is stopped.

Figure 14C:
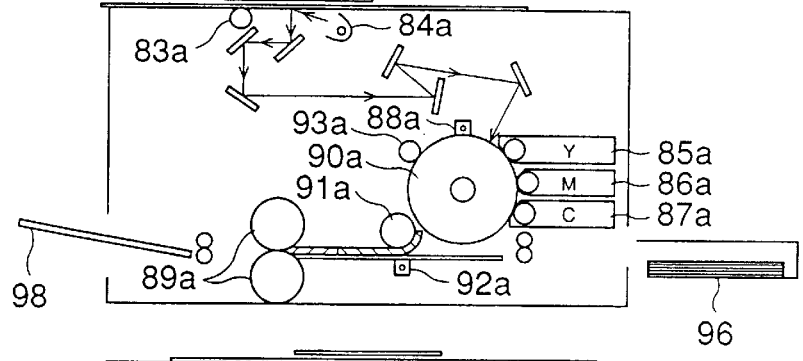

When the divisional recording instruction block 101 determines that the color image segment has been transferred to the recording sheet, the sequence control circuit 81 controls the color image reading block 104 so that a remaining area of the document corresponding to the next area segment is scanned. A color image segment is formed on the intermediate transfer drum 91*a* in the same manner as in the previous color image segment described above. After this, the sheet feeding signal S45 and the transfer control signal S46 are simultaneously activated (see interval (c) in FIG. 13). The recording sheet feed is then restarted. The color image segment corresponding to the next area segment is transferred from the intermediate transfer drum 91*a* to the recording sheet by the transfer device 92*a* so that the color image segment is continuous with the previous color image segment, as shown in FIG. 14C.

The above operations are repeated until an area corresponding to the sheet size input by the sheet size input block 102 is completely scanned by the color image reading block 104. As a result, a color image in which a plurality of color image segments are continuous with each other is formed on the recording sheet having a size input by the sheet size input block 102.

Figure 14D:
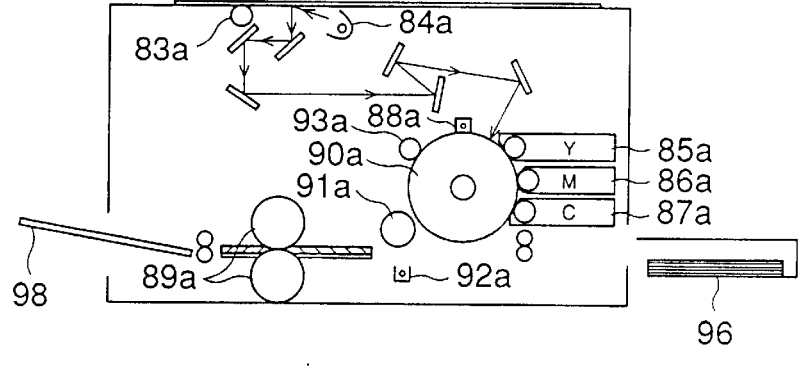

The recording sheet on which the color image is formed is fed to the fixer 89*a*, and the color image is fixed on the recording sheet by the fixer 89 as shown in FIG. 14D. The recording sheet is then ejected to the stacking tray 98, and the operations are terminated (see an interval (d) in FIG. 13).

A description will now be given, with reference to FIGS. 15, 16A, 16B, 16C, 16D and 17, of a fourth embodiment of the present invention. In FIGS. 15, 16A, 16B, 16C, 16D, those parts which are the same as those shown in FIGS. 5, 7A, 7B, 7C and 7D are given the same reference numbers.

Figure 15:
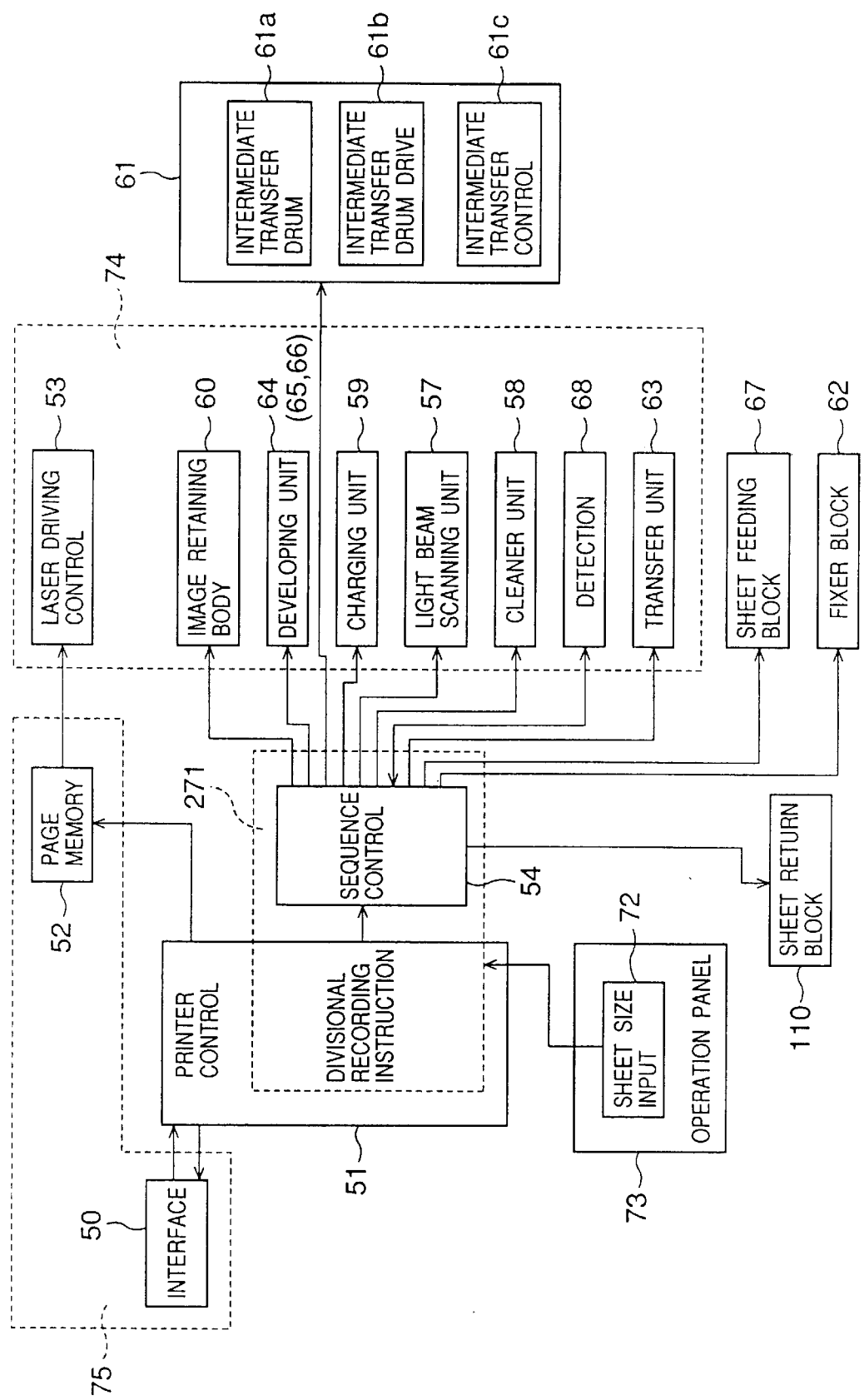
FIG. 15 is a block diagram illustrating the laser printer according to a fourth embodiment of the present invention.

Referring to FIG. 15, a color page printer has the data supply block 75, the image forming block 74, the intermediate recording block 61, the sheet feeding block 67, the sheet size input block 72 and the fixing block 62 in the same manner as in the first embodiment (see FIG. 5). The color page printer according to the fourth embodiment further has a sheet return block 110. The sheet return block 110 includes a feed-back path from the downstream side of the fixer 82*a* to the upstream side of a transfer position at which a color image is to be transferred to a recording sheet, as shown in each of FIGS. 16A, 16B, 16C and 16D. The color page printer has also a divisional recording instruction block 271 formed as functions of the printer control circuit 51 and the sequence control circuit 54. The functions corresponding to the divisional recording instruction block 271 differ from functions corresponding to the divisional recording instruction block 71 in the first embodiment.

Figure 16A:
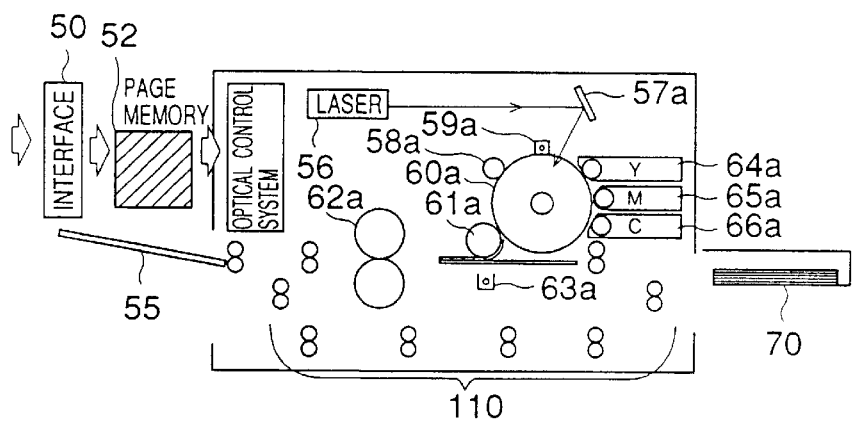
FIGS. 16A, 16B, 16C and 16D are diagrams illustrating operations of the laser printer according to the fourth embodiment of the present invention.

In the color page printer of the fourth embodiment, a cyan toner image, a magenta toner image and a yellow toner image each of which corresponds to an image data segment supplied from the host unit are successively transferred to and overlapped on the intermediate transfer drum 61*a* based on the signals S1–S14 shown in FIG. 17, in the same manner as those in the first embodiment. After this, the sequence control circuit 54 (the divisional recording instruction block 271) activates a first sheet feeding signal S21 as shown in FIG. 17 so that a recording sheet is fed from the sheet cassette 70 toward the intermediate transfer drum 61*a*. The recording sheet is further fed, and the sequence control circuit 54 activates the transfer control signal S16. As a result, while the recording sheet is being fed, the color image segment is transferred from the intermediate transfer drum 61*a* to the recording sheet as shown in FIG. 16A (see an interval (a) in FIG. 17).

Figure 16B:
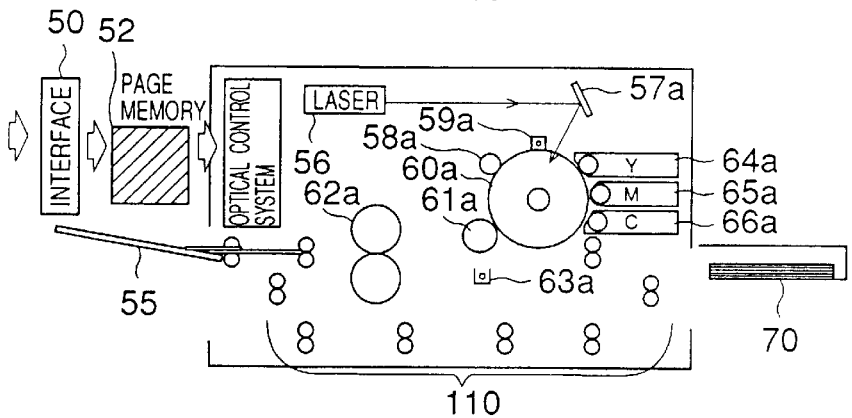
Figure 16C:
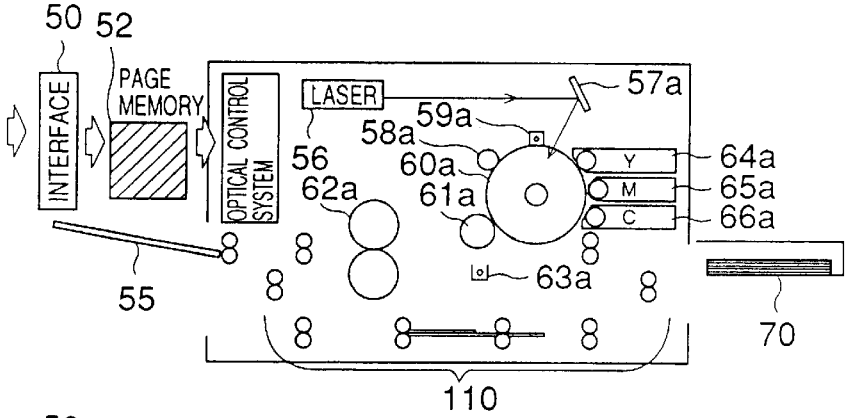

After this, the first sheet feeding signal S21 is continuously in an active state, so that the recording sheet is fed through the fixer 62*a* to the stacking tray 55, as shown in FIG. 16B (see interval (b) in FIG. 17). The first sheet feeding signal S21 is then made inactive. At this time, the sequence control circuit 54 activates a second sheet feeding signal S22 (see interval (c) in FIG. 17). The sheet return block 110 which receives the activated second sheet feeding signal S22 feeds the recording sheet back to the sheet cassette 70 as shown in FIG. 16C.

Figure 16D:
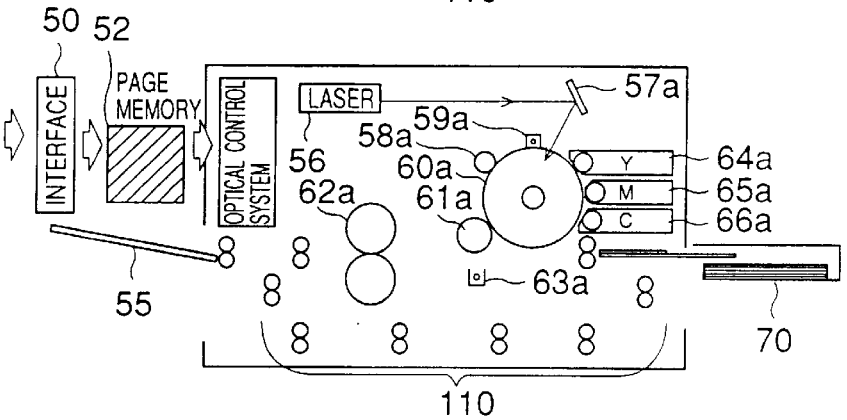

After the recording sheet reaches the sheet cassette 70 as shown in FIG. 16D, the second sheet feeding signal S22 is made inactive and the printer control circuit 51 controls the interface 50 so that the ready signal S1 is activated. The host unit thus supplies the next image data segment to the color page printer. In the color page printer, a cyan toner image, a magenta toner image and a yellow toner image each of which corresponds to the next image data segment are overlapped on the intermediate transfer drum 61*a* and a color image segment corresponding to the next image data segment is formed, in the same manner as in the first embodiment. After this, the first sheet feeding signal S21 is activated, so that the recording sheet on which the color image segment is formed is fed from the sheet cassette 70 toward the intermediate transfer drum 61*a*. When the trailing edge of the color image segment reaches a transfer point at which an image is to be transferred, the sequence control circuit 54 activates the transfer control signal S16. As a result, while the recording sheet is being fed, the color image segment corresponding to the next data segment is transferred from the intermediate transfer drum 61*a* to the recording sheet such that the leading edge of the color image segment is in contact with the trailing edge of the previous color image segment. The previous color image segment and the color image segment corresponding to the next image data segment are continuously formed on the recording sheet.

After this, the above operations are repeated until a color image segment corresponding to the last image data segment is transferred to the recording sheet. After the color image segment corresponding to the last image data segment is transferred to the recording sheet, the recording sheet is fed to the fixer 62*a* and the color image segment corresponding to the last image segment is fixed on the recording sheet (see interval (d) in FIG. 17). The recording sheet is then ejected to the stacking tray 55.

Figure 18:
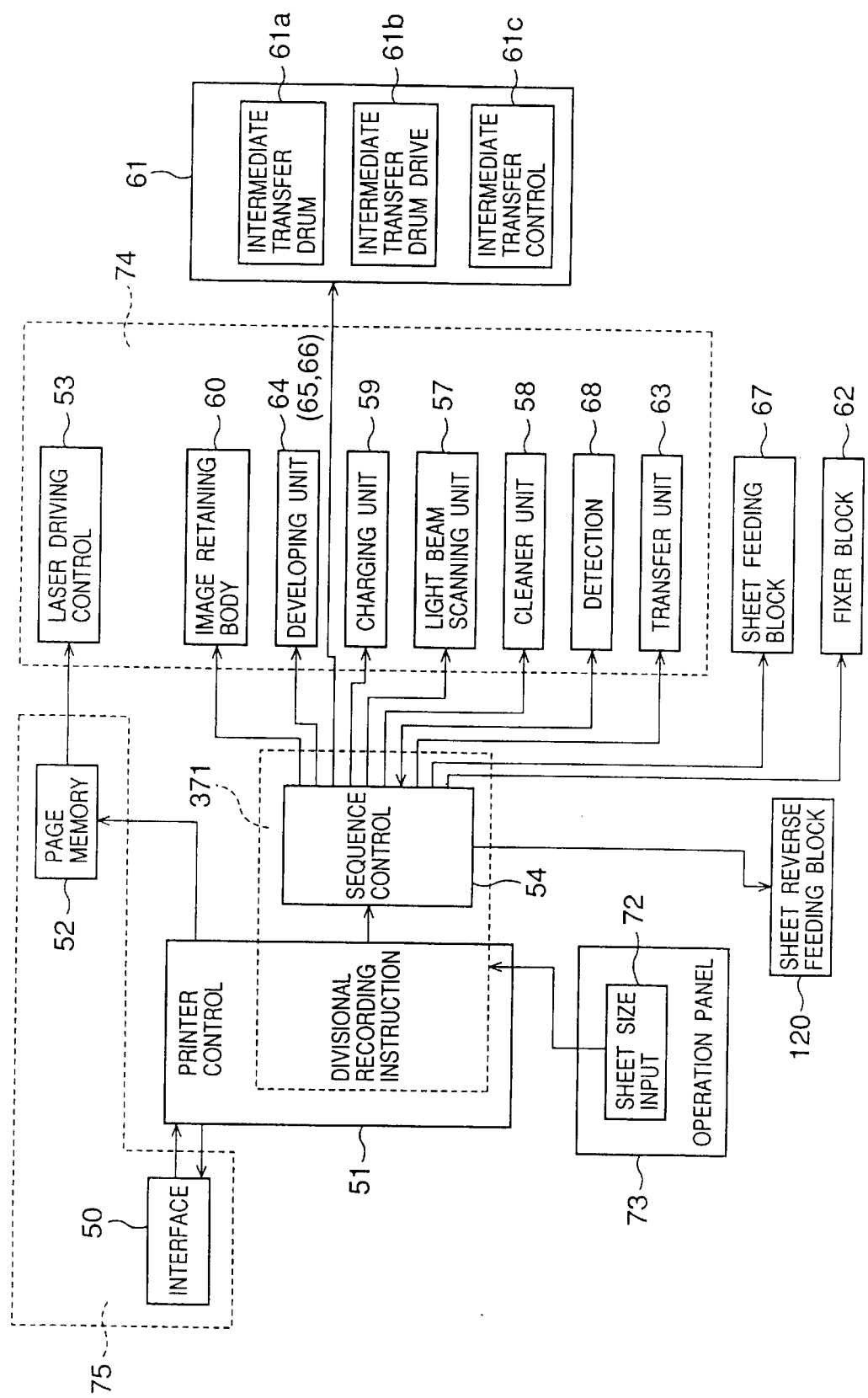
FIG. 18 is a block diagram illustrating the laser printer according to a fifth embodiment of the present invention.

A description will now be given, with reference to FIGS. 18 and 19, of a fifth embodiment of the present invention. In FIGS. 18 and 19, those parts which are the same as those shown in FIGS. 5 and 15 are given the same reference numbers.

Referring to FIG. 18, a color printer has the data supply block 75, the image forming block 74, the image intermediate recording block 61, the sheet feeding block 67, the sheet size input block 72 and fixing block 62 in the same manner as that in the first embodiment (see FIG. 5). The color page printer according to the fifth embodiment further has a sheet reverse feeding block 120. The sheet reverse feeding block 102 includes a driving unit for driving the sheet feeding mechanism such that a recording sheet is fed in a reverse direction. The color page printer has also a divisional recording instruction block 371 formed as functions of the printer control circuit 51 and the sequence control circuit 54. The divisional recording instruction block 371 has the same functions as that in the first embodiment and an additional function for controlling the sheet reverse feeding block 120.

Figure 19A:
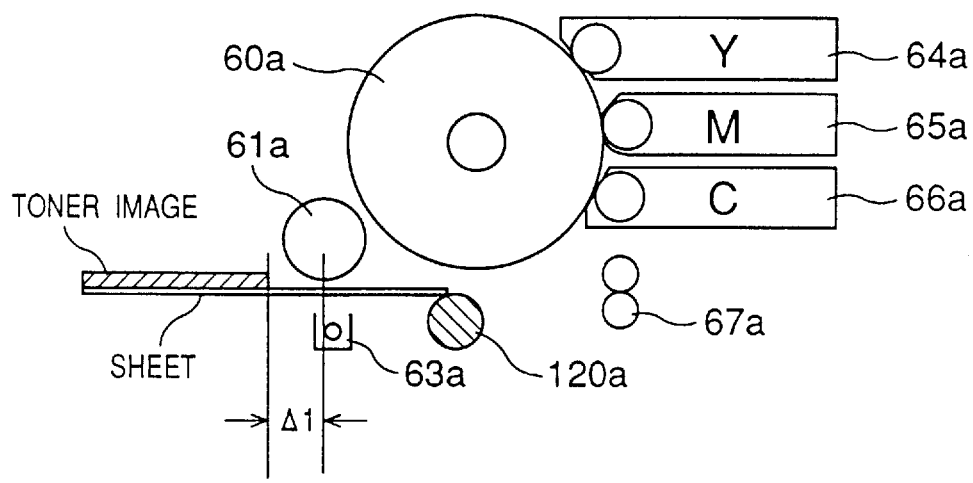
FIG. 19 (A) and (B) is a diagram illustrating a feeding operation of a recording sheet in the laser printer according to the fifth embodiment of the present invention.
Figure 19B:
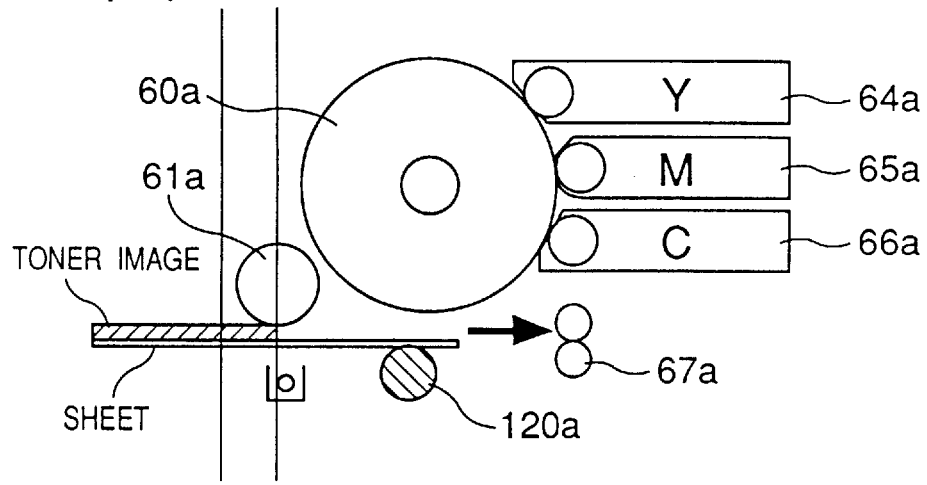

In the color page printer, each color image segment is transferred from the intermediate transfer drum 61a to a recording sheet in the same manner as in the first and fourth embodiments. When each color image is transferred from the intermediate transfer drum 61a to the recording sheet, the recording sheet is fed in synchronism with the rotation of the intermediate transfer drum 61a. However, even if a color image segment is completely transferred to the recording sheet, the recording sheet is further fed or moved. This is caused by inertia of the recording sheet due to the feeding operation so that the trailing edge of the color image segment is separated by an increment Δl from a transfer point at which an image is to be transferred, as shown in FIG. 19(A). If the next color image is transferred to the recording sheet in this state, a slit is formed between the adjacent color image segments on the recording sheet. Thus, in the fifth embodiment, after a color image segment is completely transferred to the recording sheet, the sequence control circuit 54 controls the sheet reverse feeding block 120 so that the recording sheet is fed in a reverse direction by a predetermined length, as shown in FIG. 19(B). As a result, before a color image segment corresponding to the next image data segment is transferred to the recording sheet, the trailing edge of the color image segment on the recording sheet is located at the transfer point. Thus, the color image segment corresponding to the next data segment can be formed on the recording sheet so as to be continuous with the previous color image segment.

A description will now be given, with reference to FIGS. 20 and 21, of a sixth embodiment of the present invention. In FIGS. 20 and 21, those parts which are the same as those shown in FIGS. 18 and 19 are given the same reference numbers.

Figure 21A:
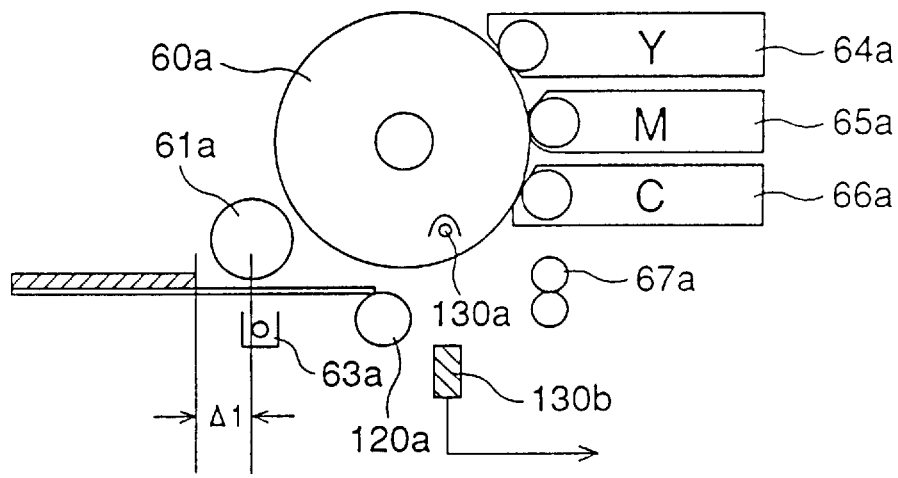
FIG. 21 (A) and (B) is a diagram illustrating a feeding operation of a recording sheet in the laser printer according to the sixth embodiment of the present invention.

Referring to FIG. 20, a color printer has the data supply block 75, the image forming block 74, the image intermediate recording block 61, the sheet feeding block 67, the sheet size input block 72, a fixing block 62 and the sheet reverse feeding block 120 in the same manner as that in the fifth embodiment (see FIG. 18). The color page printer according to the sixth embodiment further has a sheet detecting unit 130. The sheet detecting unit 130 has a light-emitting device 130a and a photo-detector 130b. The light-emitting device 130a and the photo-detector 130b are located at positions so that the trailing edge of a recording sheet is detected when the trailing edge of the color image segment on the recording sheet is positioned at the transfer position as shown in FIG. 21(A) and (B). The color page printer also has a divisional recording instruction block 471 formed as functions of the printer control circuit 51 and the sequence control circuit 54. The divisional recording instruction block 471 has the same functions as that in the fifth embodiment and an additional function for controlling the sheet detecting unit 130.

In the color page printer, each color image segment is transferred from the intermediate transfer drum 61a to a recording sheet in the same manner as in the fifth embodiment. After a first color image segment is completely transferred from the intermediate transfer drum 61a to the recording sheet, the sequence control circuit 54 controls, by monitoring a detected result (an output signal from the photo-detector 103b) from the sheet detecting unit 130, the sheet reverse feeding block 120 so that the recording sheet is fed in the reverse direction. When the sheet detecting unit 130 detects the trailing edge of the recording sheet, the sequence control circuit 54 controls the sheet reverse feeding block 120 so that the recording sheet is stopped. At this time, the trailing edge of the first color image segment on the recording sheet is accurately located at the transfer position. In this state, after a second color image is formed on the intermediate transfer drum 61a, the sequence control circuit 54 simultaneously activates the sheet feeding signal S15 and the transfer control signal S16. As a result, the second color image segment is transferred from the intermediate transfer drum 61a to the recording sheet so that the first and second color image segments are continuous with each other.

Figure 21B:
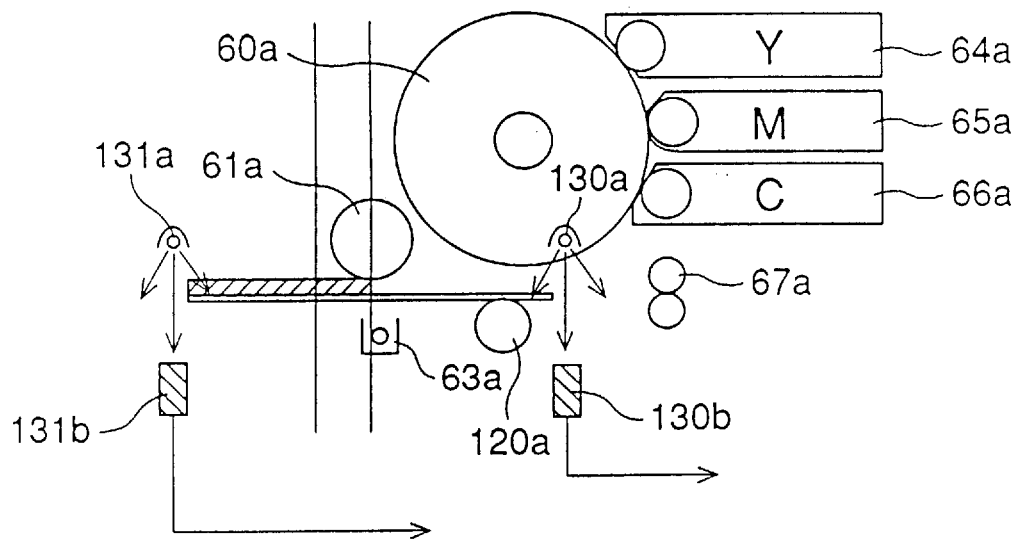

The sheet detecting unit 130 may be formed of a light-emitting device 131a and a photo-detector 131b arranged as shown in FIG. 21(B). In this case, the light-emitting device 131a and the photo-detector 131b are located at positions so that the leading edge of the recording sheet is detected when the trailing edge of the first color image segment is positioned at the transfer position.

According to the sixth embodiment, it can be accurately detected that the trailing edge of the first color image segment is positioned at the transfer position. Thus, a color image in which the first and second color image segment are accurately continuous with each other can be formed on the recording sheet.

Figure 22:
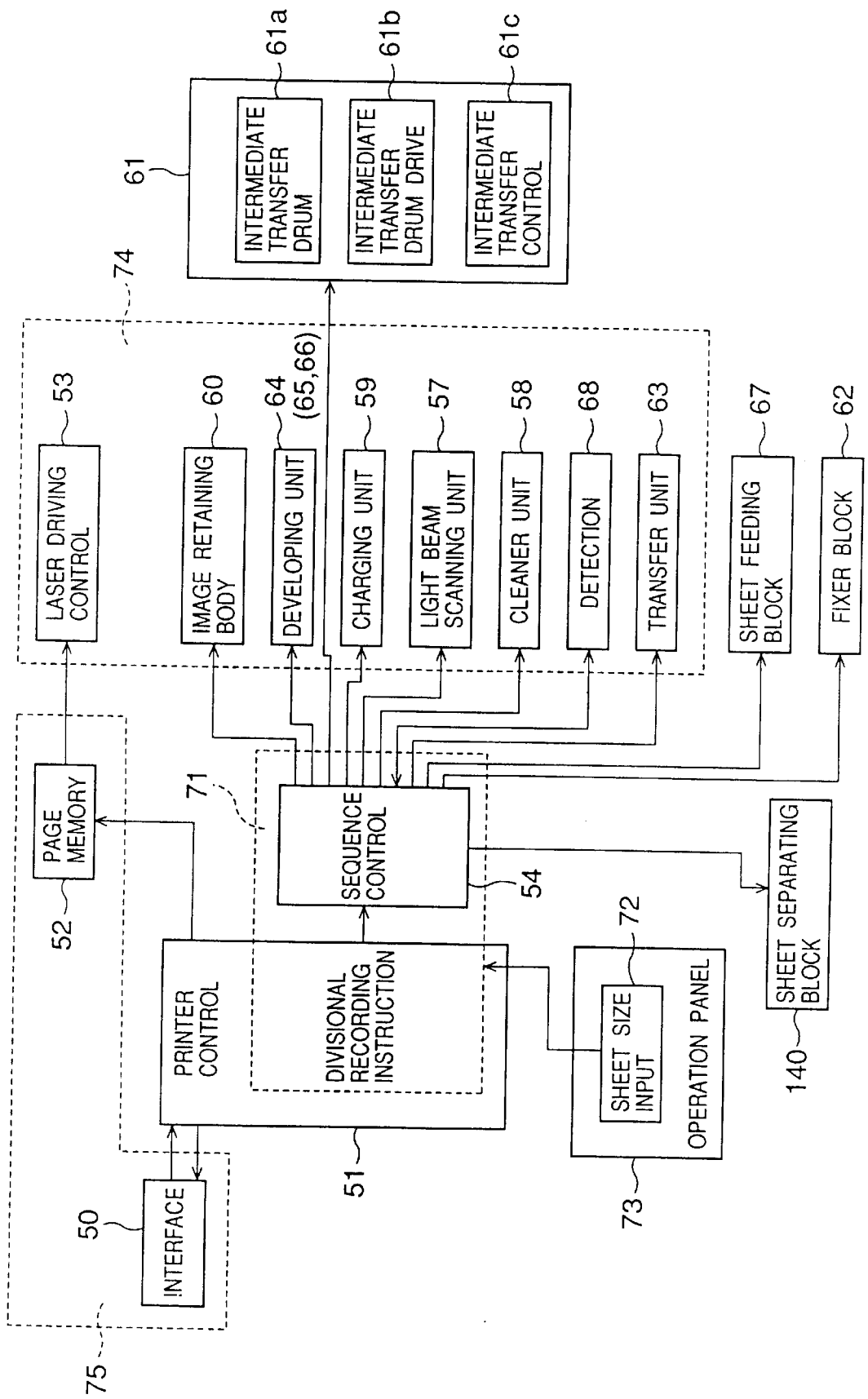
FIG. 22 is a block diagram illustrating the laser printer according to a seventh embodiment of the present invention.
Figure 23A:
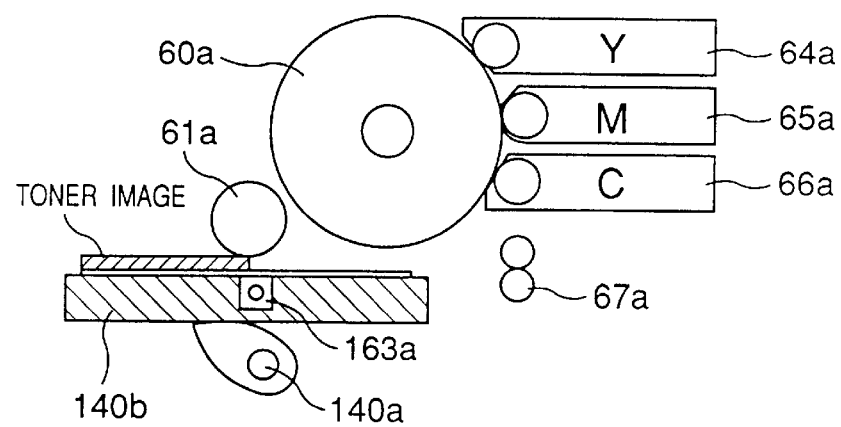
FIGS. 23A and 23B are diagrams illustrating a feeding operation of a recording sheet in the laser printer according to the seventh embodiment of the present invention.
Figure 23B:
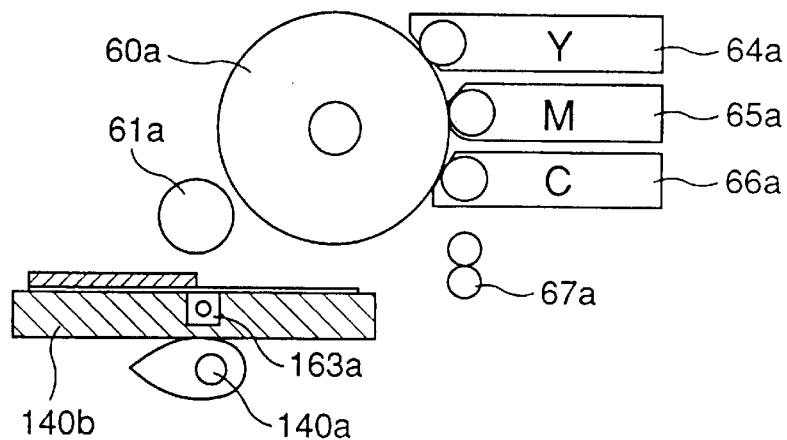

A description will now be given, with reference to FIGS. 22, 23A and 23B, of a seventh embodiment of the present invention. In FIGS. 22, 23A and 23B, those parts which are the same as those shown in FIG. 5 are given the same reference numbers.

Referring to FIG. 22, a color printer has the data supply block 75, the image forming block 74, the image intermediate recording block 61, the sheet feeding block 67, the sheet size input block 72 and fixing block 62 in the same manner as that in the first embodiment (see FIG. 5). The color page printer according to the seventh embodiment further has a sheet separating block 140. The sheet separating block 140 includes a cam mechanism 140a and a driven stage 140b. The driven stage 140b is provided between the intermediate transfer drum 61a and the cam mechanism 140a. Recording sheets are fed on the driven stage 140b, and a transfer device 163a is mounted on the driven stage 140b. The driven stage 140b can be lifted up so that a recording sheet on the driven stage 140b is brought into contact with the intermediate transfer drum 61a and lowered by the cam mechanism 140a so that the recording sheet is separated from the intermediate transfer drum 61a. The color page printer has also a divisional recording instruction block 471 formed as functions of the printer control circuit 51 and the sequence control circuit 54. The divisional recording instruction block 471 has the same functions as that in the first embodiment and an additional function for controlling the sheet separating block 140.

In the color page printer, the sequence control circuit 54 controls the sheet separating block 140 so that the driven stage 140b is lowered by the cam mechanism 140a. In this state, the sequence control circuit 54 activates the sheet feeding signal S15 so that a recording sheet is fed. When a color image segment is formed on the intermediate transfer drum 61a and the recording sheet reaches the transfer point, the driven stage 140b is lifted up by the cam mechanism 140a. The transfer control signal S16 is then activated so that the color image segment is transferred to the recording sheet which is being fed on the driven stage 140b. When the color image segment is completely transferred to the recording sheet, the recording sheet is stopped and the driven stage 140b is lowered by the cam mechanism. In this state, the next color segment is formed on the intermediate transfer drum 61a which is rotated. After this, the driven stage 140b is lift by the cam mechanism 140a and the sheet feeding signal S15 and the transfer control signal S16 are activated. As a result, the next color image segment is transferred from the intermediate transfer drum 61a to the recording sheet by the transfer device 163a so as to be continuous with the previous color image segment.

According to the seventh embodiment, while each color image segment is being formed on the intermediate transfer drum 61a, the recording sheet is separated from the intermediate transfer drum 61a. Thus, quality of toner images which are to be overlapped are prevented from being deteriorated by contact with the recording sheet. As a result, a color image having high quality can be formed on the recording sheet.

Functions in the respective embodiments described above may be combined.

In addition, the present invention may be applicable to a case where a plurality of monochromatic image segments are successively transferred to a recording sheet.

Image segments into which an image to be formed is divided may have different sizes. For example, an image to be formed may be divided into an image segment having a size of A4 and an image segment having a size of A3.

The present invention is not limited to the aforementioned embodiment, and other variations and modifications may be made without departing from the scope of the claimed invention.

What is claimed is:

1. An image forming apparatus comprising:
    a photosensitive medium;
    an intermediate medium;
    divisional image forming means for forming image segments into which an image to be formed is divided on said intermediate medium, one by one, wherein said image segments comprises at least a previous image segment and a next image segment;
    sheet feeding means for feeding a recording sheet;
    transfer means for transferring an image segment form said photosensitive medium to said intermediate medium and then to a recording sheet fed by said sheet feeding means every time the image segment is formed on said intermediate medium, wherein said intermediate medium is capable of holding only one of said previous image segment and said next image segment; and
    control means for controlling said sheet feeding means and said transfer means so that said next image segment is formed on said sheet such that a trailing edge of said previous image segment is in contact with a leading edge of said next image segment and the image segments formed by said divisional image forming means are successively transferred from said intermediate medium to the recording sheet so as to be continuous with each other.

2. The image forming apparatus as claimed in claim 1, wherein said control means includes stop control means for temporarily stopping the recording sheet from being fed by said sheet feeding means from a time at which the image segment is completely transferred to the recording sheet to a time at which a next image segment is to be transferred to the recording sheet.

3. The image forming apparatus as claimed in claim 1, wherein an area of each of the image segments is dependent on an area of said intermediate medium.

4. The image forming apparatus as claimed in claim 1, wherein said divisional image forming means has image data storage means for storing image data corresponding to each of the image segments, said divisional image forming means forming each of the image segments using the image data stored in said image data storage means; and, wherein an area of each of the image segments is dependent on an amount of image data which can be stored in said image data storage means.

5. The image forming apparatus as claimed in claim 2 further comprising:
    a sheet position changing mechanism for locating the recording sheet at one of a first position and a second position, the first position being closer to said intermediate recording medium than the second position, wherein
    said control means further has sheet position control means for controlling said sheet position changing means so that the recording sheet is at the first position while an image segment is being transferred from said intermediate medium to the recording sheet and is at the second position in the absence of image segment being transferred to the recording sheet.

6. The image forming apparatus as claimed in claim 2, wherein said control means has sheet fine adjusting means for controlling the sheet feeding means so that after the recording sheet is stopped, the recording sheet is located at a position at which a leading edge of the next image segment to be transferred is in contact with a trailing edge of the image segment formed on the recording sheet.

7. The image forming apparatus as claimed in claim 6, wherein said sheet fine adjusting means has detecting means for detecting a position of the recording sheet, the sheet feeding means being controlled based on the position detected by the detecting means.

8. The image forming apparatus as claimed in claim 1, wherein said sheet feeding means has sheet returning means for returning the recording sheet to which an image segment has been transferred to an upstream side of a transfer point at which an image segment is to be transferred from the intermediate medium to the recording sheet; and, wherein said control means controls said sheet returning means so that the recording sheet returns to the upstream side of the transfer point to transfer a next image segment from the intermediate medium to the recording sheet.

9. The image forming apparatus as claimed in claim 1, wherein image data corresponding to the image to be formed on the recording sheet is supplied from an external unit, said divisional image forming means successively forms the image segments using image data segments into which the image data supplied from said external unit is divided.

10. The image forming apparatus as claimed in claim 1 further comprising:
    image reading means for reading a document and generating image information corresponding to the document, wherein
    said divisional image forming means successively forms the image segments on said intermediate medium using image information segments into which the image information generated by said image reading means is divided.

11. The image forming apparatus as claimed in claim 1, wherein each of the image segments is a color image segment formed by repeatedly performing an electrophotographic process a plurality of times using different color developers.

* * * * *